United States Patent
Martin

(10) Patent No.: US 11,077,920 B2
(45) Date of Patent: Aug. 3, 2021

(54) MODULAR FOIL SYSTEM FOR TOWED MARINE ARRAY

(71) Applicant: GX Technology Canada Ltd., Calgary (CA)

(72) Inventor: Daniel George Martin, Woodstock (CA)

(73) Assignee: Ion Geophysical Corporation, Houston, TX (US)

( * ) Notice: Subject to any disclaimer, the term of this patent is extended or adjusted under 35 U.S.C. 154(b) by 0 days.

(21) Appl. No.: 16/597,147

(22) Filed: Oct. 9, 2019

(65) Prior Publication Data
US 2020/0108898 A1     Apr. 9, 2020

Related U.S. Application Data

(60) Provisional application No. 62/743,480, filed on Oct. 9, 2018.

(51) Int. Cl.
*B63B 21/66* (2006.01)
*B63G 8/42* (2006.01)
(Continued)

(52) U.S. Cl.
CPC .............. *B63B 21/66* (2013.01); *B63B 1/242* (2013.01); *B63B 1/285* (2013.01)

(58) Field of Classification Search
CPC .. B63B 1/00; B63B 1/02; B63B 21/66; B63B 21/663; B63B 2021/666; B63B 1/16;
(Continued)

(56) References Cited

U.S. PATENT DOCUMENTS

| 2,435,956 A | 2/1948 | Craig |
| 2,523,925 A | 9/1950 | Sorensen |

(Continued)

FOREIGN PATENT DOCUMENTS

| CN | 1355750 A | 6/2002 |
| CN | 1954239 A | 4/2007 |

(Continued)

OTHER PUBLICATIONS

Office Action received for Chinese Patent Application No. 201680074025.3 dated Jan. 9, 2020, 18 pages including 12 pages of English translation.

(Continued)

*Primary Examiner* — Daniel V Venne
(74) *Attorney, Agent, or Firm* — Patterson + Sheridan, LLP

(57) ABSTRACT

A marine array having various embodiments of a modular foil system is disclosed. The modular foil system may be configured to generate lift when towed in a marine environment, and thus used to move, position, and/or depress instrument of the array. The modular foil system may include multiple groups of foil sections, each having an angle of attack that is adjustable relative to other groups of foil sections. For example, each group may be supported by a pair of through cables, and an actuator may adjust a tension in one or both of through cables, thereby alerting the angle of attack. The pair of through cables may converge toward one another at connection points adjacent opposing ends of a given group of foil sections of the modular system. The connection points thus establishing a modular framework to couple the given group to other groups of foils of the system.

20 Claims, 19 Drawing Sheets

(51) Int. Cl.
*B63G 9/00* (2006.01)
*B63B 1/24* (2020.01)
*B63B 1/28* (2006.01)

(58) Field of Classification Search
CPC .... B63B 1/18; B63B 1/20; B63B 1/22; B63B 1/24; B63B 1/242; B63B 1/248; B63B 1/26; B63B 1/28; B63B 1/285; B63B 1/286; B63B 1/30; B63B 1/32; B63B 1/322; B63B 2001/325; B63B 2001/281
USPC .................. 114/244, 245, 274, 253, 312, 313
See application file for complete search history.

(56) References Cited

U.S. PATENT DOCUMENTS

| | | | |
|---|---|---|---|
| 2,914,878 | A | 12/1959 | Sterner et al. |
| 3,943,483 | A | 3/1976 | Strange |
| 4,010,706 | A | 3/1977 | Pretet |
| 4,180,935 | A | 1/1980 | Goudey et al. |
| 4,365,574 | A | 12/1982 | Norminton |
| 4,404,664 | A | 9/1983 | Zachariadis |
| 4,484,534 | A | 11/1984 | Thillaye due Boullay |
| 4,514,924 | A | 5/1985 | Ojserkis et al. |
| 4,567,841 | A | 2/1986 | Hale |
| 4,823,325 | A | 4/1989 | Cole, Jr. |
| 4,829,929 | A | 5/1989 | Kerfoot |
| 5,444,933 | A | 8/1995 | Kinoshita et al. |
| 6,016,286 | A | 1/2000 | Olivier et al. |
| 6,131,327 | A | 10/2000 | Larsen |
| 6,144,342 | A | 11/2000 | Bertheas et al. |
| 6,189,475 | B1 | 2/2001 | Coakley |
| 6,226,225 | B1 | 5/2001 | Barker et al. |
| 6,453,597 | B1 | 9/2002 | Kirkpatrick |
| 6,504,792 | B2 | 1/2003 | Barker et al. |
| 6,532,189 | B2 | 3/2003 | Barker |
| 6,655,311 | B1 | 12/2003 | Martin et al. |
| 6,671,223 | B2 | 12/2003 | Bittleston |
| 6,691,038 | B2 | 2/2004 | Zajac et al. |
| 6,837,175 | B1 | 1/2005 | Gieseke |
| 6,932,017 | B1 | 8/2005 | Bittleston et al. |
| 7,080,607 | B2 | 7/2006 | Bittleston et al. |
| 7,162,967 | B2 | 1/2007 | Bittleston et al. |
| 7,222,579 | B2 | 5/2007 | Bittleston et al. |
| 7,293,520 | B2 | 11/2007 | Bittleston et al. |
| 7,380,513 | B2 | 6/2008 | Lie |
| 7,404,370 | B2 | 7/2008 | Stokkeland |
| 7,499,373 | B2 | 3/2009 | Toennessen |
| 7,577,060 | B2 | 8/2009 | Toennessen et al. |
| 7,738,317 | B2 | 6/2010 | Toennessen |
| 7,755,970 | B2 | 7/2010 | Welker et al. |
| 7,793,606 | B2 | 9/2010 | Olivier et al. |
| 8,226,328 | B2 | 7/2012 | Thompson et al. |
| 8,230,801 | B2 | 7/2012 | Bittleston et al. |
| 8,391,101 | B2 | 3/2013 | Brewer et al. |
| 8,391,102 | B2 | 3/2013 | Holo et al. |
| 8,593,905 | B2 | 11/2013 | Gagliardi et al. |
| 8,743,655 | B2 | 6/2014 | Bittleston et al. |
| 8,897,094 | B2 | 11/2014 | Brewer et al. |
| 8,997,675 | B2 | 4/2015 | MacQuin et al. |
| 9,075,165 | B2 | 7/2015 | Vageskar et al. |
| 9,151,859 | B2 | 10/2015 | Martin |
| 9,211,940 | B2 | 12/2015 | Richer De Forges |
| 9,221,524 | B2 | 12/2015 | Richer De Forges |
| 9,244,184 | B2 | 1/2016 | Voldsbekk |
| 9,244,187 | B2 | 1/2016 | Berentzen et al. |
| 9,494,703 | B2 | 11/2016 | Mork et al. |
| 9,581,714 | B2 | 2/2017 | Barral et al. |
| 9,632,195 | B2 | 4/2017 | Martin |
| 9,676,454 | B2 | 6/2017 | Simonnot et al. |
| 9,880,308 | B2 | 1/2018 | Steinsland et al. |
| 10,488,541 | B2 * | 11/2019 | Schneider ............ G01V 1/3826 |
| 10,507,893 | B2 * | 12/2019 | Martin ..................... B63G 8/42 |
| 2006/0176775 | A1 | 8/2006 | Toennessen |
| 2008/0029012 | A1 | 2/2008 | Stokkeland |
| 2010/0149910 | A1 | 6/2010 | Martin |
| 2010/0226204 | A1 | 9/2010 | Gagliardi et al. |
| 2011/0103179 | A1 | 5/2011 | Vageskar et al. |
| 2011/0203509 | A1 | 8/2011 | Austad et al. |
| 2012/0067265 | A1 | 3/2012 | Valø et al. |
| 2013/0088937 | A1 | 4/2013 | Sykes |
| 2013/0182531 | A1 | 7/2013 | Gagliardi et al. |
| 2014/0104985 | A1 | 4/2014 | Gagliardi et al. |
| 2014/0140169 | A1 | 5/2014 | Cambois et al. |
| 2014/0247691 | A1 | 9/2014 | Martin |
| 2014/0247692 | A1 | 9/2014 | Simonnot |
| 2014/0269174 | A1 | 9/2014 | Gagliardi et al. |
| 2015/0268366 | A1 | 9/2015 | Vågeskar et al. |
| 2015/0272094 | A1 | 10/2015 | Pearlman |
| 2016/0067265 | A1 | 3/2016 | Nemeth et al. |
| 2016/0161622 | A1 | 6/2016 | Martin |
| 2017/0106946 | A1 | 4/2017 | Schneider |
| 2017/0184749 | A1 | 6/2017 | Mckey, III et al. |
| 2017/0199293 | A1 | 7/2017 | Marshall et al. |
| 2017/0233040 | A1 | 8/2017 | Martin |
| 2018/0027784 | A1 | 2/2018 | Martin |
| 2019/0302300 | A1 | 10/2019 | Martin |

FOREIGN PATENT DOCUMENTS

| | | |
|---|---|---|
| CN | 102103214 A | 6/2011 |
| CN | 102405419 A | 4/2012 |
| CN | 102483464 A | 5/2012 |
| CN | 103129414 A | 6/2013 |
| DE | 3933398 A1 | 4/1991 |
| EP | 0884607 A2 | 12/1998 |
| EP | 2317341 A2 | 5/2011 |
| EP | 2776863 B1 | 2/2015 |
| ES | 1018874 U | 2/1992 |
| GB | 108761 A | 8/1917 |
| GB | 282520 A | 12/1927 |
| GB | 682349 A | 11/1952 |
| GB | 693238 A | 6/1953 |
| GB | 2342081 A | 4/2000 |
| GB | 2400662 B | 10/2004 |
| GB | 2492642 A | 1/2013 |
| GB | 2492652 A | 1/2013 |
| JP | 32-2083 | 4/1957 |
| JP | 45-39013 | 12/1970 |
| JP | 3-76456 | 7/1991 |
| WO | 9516344 A1 | 6/1995 |
| WO | 0076839 A1 | 12/2000 |
| WO | 2010111377 A2 | 9/2010 |
| WO | 2013059926 A1 | 5/2013 |
| WO | 2014003573 A2 | 1/2014 |
| WO | 2014145861 A1 | 9/2014 |
| WO | 2016086293 A1 | 6/2016 |
| WO | 2016127245 A1 | 8/2016 |

OTHER PUBLICATIONS

Third Technical Examination received for Danish Patent Application No. PA 2017 70548, dated Jan. 10, 2020, 2 pages.
International Search Report and Written Opinion issued for PCT Application No. PCT/CA2019/051441, dated Jan. 14, 2020, 12 pages.
Examination Report dated May 30, 2018 in connection with Danish patent application No. PA201770548, 5 pages.
Examination Report dated Nov. 2, 2018 in connection with Australian Patent Application No. 2015358314, 3 pages.
Extended European Search Report dated Jul. 2, 2018 in connection with European Patent Application No. 15864979.8, 6 pages.
Extended European Search Report dated Oct. 9, 2018 in connection with European Patent Application No. 16748506.9, 11 pages.
First examination report dated Jul. 9, 2018 in connection with Danish Patent Application No. PA201770675, 5 pages.
First Office Action and Search Report dated May 30, 2018 in connection with Chinese Patent Application No. 201580075529.2, 8 pages including English translation.
International Preliminary Report on Patentability dated Aug. 15, 2017 in connection with International Patent Application No. PCT/CA2016/000034, 4 pages.

(56) References Cited

OTHER PUBLICATIONS

International Search Report and Written Opinion dated May 20, 2016 in connection with International Patent Application No. PCT/CA2016/000034, 6 pages.
Office Action dated Nov. 26, 2019 in connection with Danish Patent Application No. PA201870583, 5 pages.
Office Action dated Nov. 26, 2019 in connection with JP Patent Application No. 2017-542383, 10 pages.
Office action dated Sep. 29, 2019, in connection with Chinese Patent Application No. 201780023806.4, 9 pages.
Second Examination Report dated Jan. 18, 2019 in connection with Danish Patent Application No. PA201770675, 4 pages.
Office Action dated Mar. 18, 2019 in connection with Danish Patent Application No. PA201870290, 5 pages., dated Mar. 18, 2019.
First Office Action dated May 30, 2019 in connection with Chinese Patent Application No. 201680074025.3, 23 pages including English translation, dated May 30, 2019.
Examination report dated Jul. 31, 2018 in connection with Canadian patent application No. 2,856,316, 4 pages., dated Jul. 31, 2018.
Extended European Search Report dated Aug. 14, 2019 in connection with European Patent Application No. 17752738.9, 9 pages., dated Aug. 14, 2019.
Second office action dated Aug. 16, 2019 in connection with Danish patent application No. PA201770548, 2 pages., dated Aug. 16, 2019.
Office Action dated Aug. 20, 2019 in connection with Danish Patent Application No. PA201870290, 3 pages., dated Aug. 20, 2019.
European Patent Office, "Extended European Search Report for Application No. 12844247.2 (5 pages)", dated Sep. 16, 2015.
International Bureau, "International Preliminary Report on Patentability for Application No. PCT/CA2012/000996 (4 pages)", dated Apr. 29, 2014.
International Searching Authorit, "International Search Report and Written Opinion for Application No. PCT/CA2012/000996 (6 pages)", dated May 2, 2013.
IP Australia, "Patent Examination Report No. 1 for Application No. 2012327836 (2 pages)", dated Jun. 24, 2014.
ISA, International Search Report and Written Opinion dated Jan. 24, 2017 in connection with International Patent Application No. PCT/US2016/057344, 13 pages.
ISA, International Search Report and Written Opinion dated Jun. 23, 2017 in connection with International Patent Application No. PCT/IB2017/000209, 11 pages.
ISA, "The International Search Report and Written Opinion in connection with PCT/CA2015/000593 (7 pages)", dated Feb. 22, 2016.
Nordic Patent Institute, "First Office Action dated Aug. 10, 2015 in connection with Danish Patent Application No. PA 2014 00278", dated Aug. 10, 2015, 7 pages.
Nordic Patent Institute, "Second Office Action dated Mar. 1, 2016 in connection with Danish Patent Application No. PA 2014 00278", dated Mar. 1, 2016, 2 pages.

* cited by examiner

MODULAR FOIL SYSTEM FOR TOWED MARINE ARRAY

CROSS REFERENCE TO RELATED APPLICATIONS

This patent application is a non-provisional patent application of, and claims priority to, U.S. Provisional Application No. 62/743,480 filed Oct. 9, 2018, and titled "Modular foil system for towed marine array," the disclosure of which is hereby incorporated by reference in its entirety.

FIELD

The described embodiments relate generally to towed marine arrays. More particularly, the present embodiments relate to system and techniques for controlling hydrodynamic foil orientation in the marine array.

BACKGROUND

In towed marine seismic exploration, a hydrophone array is typically towed behind a marine vessel near the sea surface. The hydrophones are mounted to multiple sensor cables, commonly referred to as streamers. The streamers serve as platforms or carriers for the hydrophones, which are distributed along the length of each streamer in the array.

A set of seismic sources, also towed near the sea surface, are operated to periodically emit acoustic energy. The acoustic energy of interest propagates downward through the seawater (or other water column), penetrates the ocean floor, reflects from the subsea strata and other underlying structures, and returns upward through the water column to the hydrophone array.

The reflected seismic energy (or acoustic wave energy) arrives at receiver points in the towed hydrophone array. The array includes many such receiver points, distributed along each of the streamer cables, with sensors configured to generate data records characterizing the upward-traveling acoustic wavelets (or seismic waves) received from the subsurface structures beneath the seabed, at each of the receiver points. The hydrophone data recordings are later processed to generate seismic images of the underlying structure.

In the field of subsea seismic exploration, there has recently been a demand for seismic equipment operators to conduct their surveys with the seismic equipment submerged below the depths at which most seismic surveys have been conducted in the past. These new, deeper operating targets can now lie well below the depth of the surface-referenced equipment (i.e., the vessel and the paravanes) that is used to tow and laterally spread the seismic sensors.

Typical marine depressors for maintaining equipment at a substantially constant submerged depth tend to be fairly small with very poor aspect ratios, thus resulting in low lift. Aspect ratio is defined as the span of the depressor divided by its chord line length. Wings with high aspect ratios generate high downward lift forces for minimal drag (such that lift-to-drag ratios as high as 10:1 or more are possible), whereas wings with aspect ratios as low as 1 or 2 (i.e., where span and chord are roughly the same scale) will typically have lift-to-drag ratios as low as 2:1, or even lower. Conventional depressors can often also provide payload bays which can be used to hold additional ballast to supplement the downforce generated by the depressor.

The problem with using deadweight to generate downforce is that it does not scale with tow speed—it provides a constant downforce regardless of how fast the depressor is moving through the water. This is often disadvantageous for those applications where a range of operational speeds is expected, with the requirement that the towed equipment maintain a stable depth over that speed range. Consequently, there is no easy, economical, or ideal way to submerge and operate seismic equipment, such as towed streamer cables, at the desired lower depths.

SUMMARY

Embodiments described in the present disclosure are directed to controlling an angle of attack for submerged foils of a marine array. Foil sections may be coupled to one another by a pair of cables that converge toward one another at connection points adjacent to opposing ends of the foils. An actuator may be coupled to the cables and configured to adjust tension in the cables, thereby altering an angle of attack of the foils.

In an embodiment, a marine array is disclosed. The marine array includes a cable configured to be towed by a vessel and carry a payload through a marine environment. The marine array further includes a modular foil system coupled with the cable and configured to bias the payload toward a target position. The modular foil system includes a group of foil sections collectively defining an angle of attack. The modular foil system further includes a pair of through cables supporting the group of foil sections within the modular foil system and converging toward a connection point.

In another embodiment, the marine array may further include an actuator configured to alter a tension in one or both of the pair of through cables, thereby altering the angle of attack. In some cases, the group of foil sections is a first group of foil sections defining a first angle of attack. The pair of through cables is a first pair of through cables. In this regard, the modular foil system may further include a second group of foil sections collectively defining a second angle of attack. The modular foil system may further include a second pair of through cables supporting the second group of foil sections within the modular foil system and converging toward the connection point.

In another embodiment, the second angle of attack is distinct from the first angle of attack. The marine array may further include an actuator configured to alter a tension in one or both of the first pair of through cables, thereby altering the first angle of attack relative to the second angle of attack.

In another embodiment, the payload is an instrument configured to at least one of either collect data or transmit data. The target position may include at least one of a lateral position or a depth position.

In another embodiment, the cable may be a first cable towed by the vessel. The marine array may further include a second cable towed by the vessel. The modular foil system may be arranged substantially between submerged portions of the first cable and the second cable.

In another embodiment, the cable is a cross-cable. The marine array may further include streamer cables configured to be towed behind the cross-cables. The payload may include seismic receivers carried by the streamer cables. The angle of attack may be configured to maintain the seismic receivers at a desired depth.

In another embodiment, the cable is a lateral cable of the marine array under tension. The lateral cable includes an end portion positioned along an edge of the marine array. As such, the modular foil system may be coupled with the lateral cable adjacent the end portion.

In another embodiment, the marine array may further include a spur line connected to the end portion of the lateral cable. The modular foil system may be connected to the spur line opposite the lateral cable.

In another embodiment, the cable is an upper cable. The marine array may further include a lower cable. In some cases, the upper cable and the lower cable cooperate to form a mouth of a fishing trawl. The modular foil system may be configured to increase a separation between the upper cable and the lower cable at the mouth of the fishing trawl. Additionally or alternatively, the modular foil system may be configured to laterally spread the upper cable and the lower cable.

In another embodiment, a modular foil system for biasing a cable of a marine array is disclosed. The modular foil system includes a group of foil sections defining a foil shape having a leading edge and a trailing edge. The modular foil system further includes a first through cable extending through the group of foil sections along the leading edge. The modular foil system further includes a second through cable extending through the group of foil sections along the trailing edge. The modular foil system further includes an actuator configured to adjust a tension in one or both of the first through cable or the second through cable. The first through cable and the second through cable converge at connection points adjacent opposing ends of the group of foil sections.

In another embodiment, the actuator may be a dynamic actuator configured to alter the tension in one or both of the first pair of through cables while submerged in a marine environment. Each of the connection points may be configured to couple a pair of through cables from another modular foil system of the marine array to the first through cable and the second through cable. In some cases, at least one of the connection points is defined by a ring and at least one of the pair of through cables extends through the ring.

In another embodiment, the group of foil sections defines a first duct along the leading edge of the foil shape and a second duct along the trailing edge of the foil shape. The first through cable extends through the first duct. The second through cable extends through the second duct. The group of foil sections may be configured to move within the foil system along the first through cable and the second through cable.

In another embodiment, the actuator is coupled to the first through cable. The actuator is a first actuator. The foil system further comprises a second actuator coupled to the second through cable. The first through cable and the second through cable are integral portions of a continuous cable.

In another embodiment, a method of positioning a modular foil system in a marine array is disclosed. The method includes launching an array into a marine environment, the array comprising a cable configured to carry a payload and a modular foil system coupled to the cable. The method includes acquiring submerged positional data associated with the modular foil system. The method includes determining an adjustment parameter for the modular foil system by comparing the submerged positional data with an operational target. The method includes adjusting an angle of attack of a first group of foil sections of the modular foil system using the adjustment parameter.

In another embodiment, the group of foil sections is supported within the modular foil system by a pair of through cables that converge toward a connection point. The method may further include controlling a tension in one or both of the first pair of through cables using a dynamic actuator. The dynamic actuator may be responsive to the adjustment parameter.

In another embodiment, a marine array is disclosed. The marine array includes a cable configured to be towed by a vessel and a submerged payload through a marine environment. The marine array includes a modular foil system coupled with the cable and configured to bias the submerged payload toward a target position. The modular foil system includes a first group of foil sections having a first angle of attack. The modular foil system further includes a second group of foil sections having a second angle of attack. The first angle of attack is adjustable relative to the second angle of attack.

In another embodiment, the modular foil system further comprises a first pair of through cables. The first group of foil sections is supported in the modular foil system by the first pair of through cables. The first pair of through cables converge toward a connection point, and the connection point couples the first group of foil sections to a discrete assembly of the marine array.

In another embodiment, the marine array includes an actuator configured to alter a tension in one or both of the first pair of through cables, thereby altering the first angle of attack. The actuator may be a dynamic actuator configured to alter the tension in one or both of the first pair of through cables while submerged in the marine environment. In some cases, the actuator is a turnbuckle coupled to one of the first pair of through cables.

In another embodiment, the modular foil system further comprises a second pair of through cables. The second group of foil sections is supported in the modular foil system by the second pair of through cables. The second pair of through cables converge toward the connection point. The second group of foil sections is the discrete assembly coupled to the first group of foil sections at the connection point.

In another embodiment, the cable is a cross-cable. The marine seismic array further includes streamer cables configured to be towed behind the cross-cables. The payload includes seismic instruments carried by the streamer cables. Both of the first angle of attack and the second angle of attack are configured to maintain the seismic receivers at a desired depth.

In another embodiment, the marine array includes a pair of diverters positioned at opposing ends of the cross-cable and configured to laterally spread the cross-cable when towed in the marine environment. The pair of diverters may be configured to provide a positive lift to the cross-cables along a substantially vertical direction. The modular foil system may be configured to provide a negative lift to the cross-cable along the substantially vertical direction, the negative lift operating to counteract the positive lift provided by the pair of diverters.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
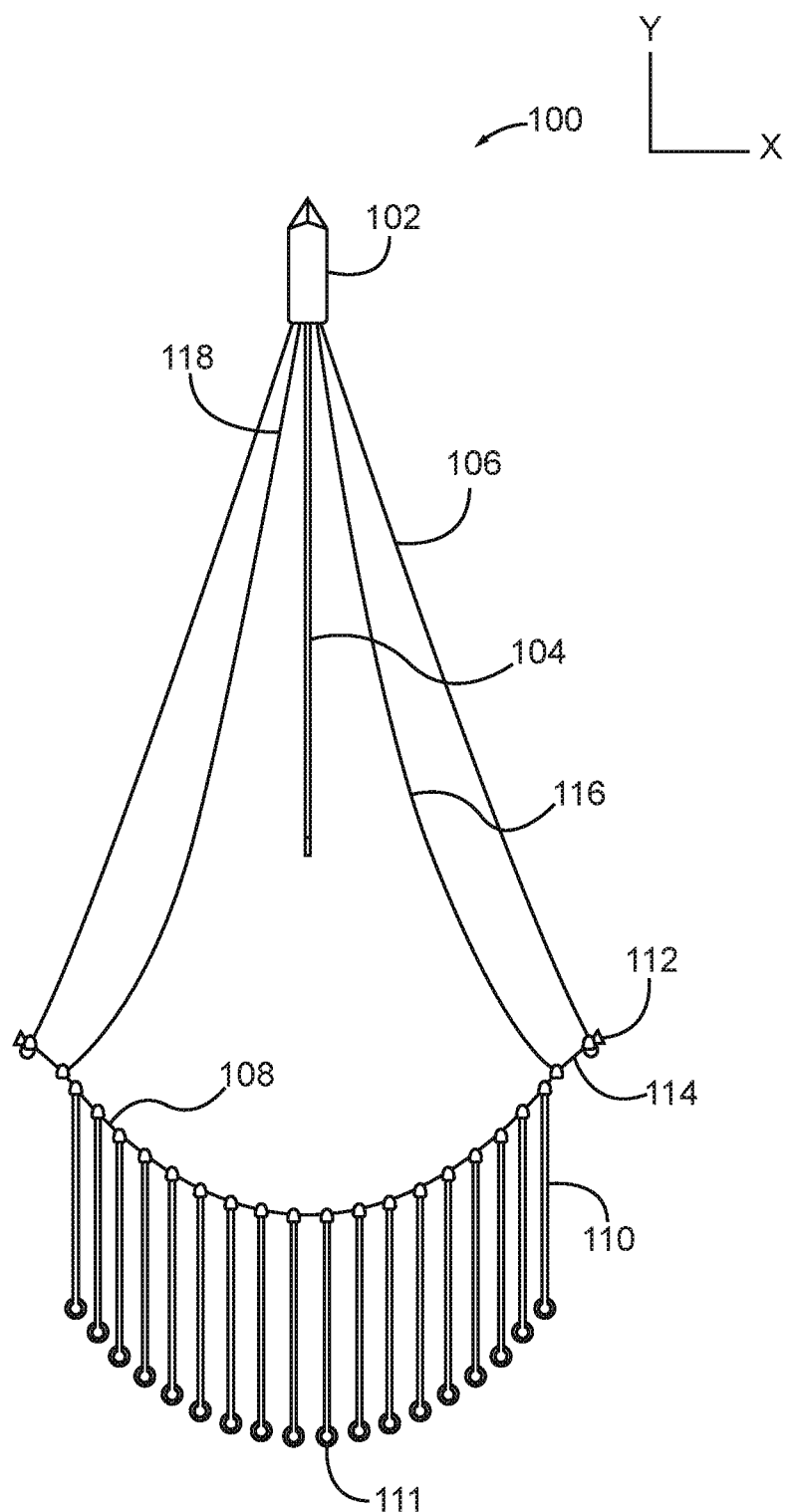
FIG. 1A depicts a top plan view of a schematic illustration of a first example of a towed marine array.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure describes systems, devices, and techniques related to controlling an orientation of foil systems of a marine array. The foil systems may be used to control movements and/or maintain a position of various instruments, devices, assemblies and so forth of the marine array. For example, a foil system may include a group of foil sections that cooperate to define a foil shape having a leading edge and a trailing edge. The group of foil sections may be coupled to instruments of the array. When towed, the group of foil sections may generate lift (e.g., including a lateral lift, a perpendicular lift and so on), due in part to an orientation or "angle of attack" of the foil shape. In turn, this lift may be used to correspondingly move instruments coupled to the foil system. The foil sections defining the foil shape may be coupled together by a through cable and/or other mechanism allowing the foil sections to move relative to one another in a dynamic marine environment. However, such movement may limit the orientation of the foil shape and/or other otherwise distort the shape due to hydrodynamic forces.

The foil system of the present disclosure may mitigate such hindrances, thereby allowing the group of foil sections to be arranged at a variety of orientations (e.g., a variety of attack angles). The foil system may be configured to generate different lifts for each orientation or angle of attack. For example, at a first angle of attack the foil system may generate a first lift, whereas at a second angle of attack the foil system may generate a second lift, distinct from the first lift. The foil system may be coupled with instruments of the marine array, as described herein, and thus each of the first lift, the second lift, or other lift may cause the coupled instruments to be steered or positioned in a desired manner. The orientation or angle of attack may be adjusted while the foil system is towed. Accordingly, the foil system may be adaptable to dynamic conditions of a marine environment and/or to particular instruments and requirements of the marine array.

To facilitate the foregoing, the foil system of the present disclosure may be configured to adjust a tension in one or more cables that support the foil sections within the marine array. For the sake of non-limiting illustration, the foil system may include a group of foil sections that are arranged adjacent one another to define the foil shape. A pair of through cables may extend through one or more of, or each of, the group of foil sections, thereby coupling the foil sections to one another and allowing for relative movement between adjacent foil sections.

When deployed, the pair of through cables may have a tension that generally allows the foil sections to orientate at an equilibrium position. The tension in one or both of the through cables may be adjusted in order to modify the orientation or angle of attack, and therefore modify a lift generated by the foil system. For example, one or more actuators may be coupled with the pair of through cables. The actuator may be configured to increase a tension in one or both of the pair of through cables. As the tension is increased, movement of foil sections relative to one another may be diminished, and the group of adjacent foil sections may collectively orientate toward, for example, an enhanced attack. The enhanced angle of attack may generate greater lift, and thus the foil system may exert a greater force on coupled instruments of the array, which may help steer or depress the instruments toward a desired position.

In turn, the foil system may also operate to diminish the angle of attack by reducing tension in the pair of through cables. For example, the actuator may operate to reduce the tension in one or both of the pair of through cables. The reduced tension may allow the foil sections to return toward the equilibrium position, thereby resulting in a diminished angle of attack. The diminished angle of attack may generate less lift, and thus the foil system, may exert a lesser force on the coupled instruments of the array. This may help steer or depress the instruments toward a desired position.

The actuator, as described herein, may be substantially any appropriate component that is used to adjust a tension in a cable. In one embodiment, the actuator may be a mechanical component, such as a turnbuckle. The turnbuckle may be manually adjusted, for example, prior to deployment of array, in order to set a desired angle of attack of the foils. Additionally or alternatively, the foil system may include various dynamic actuator, such as a pneumatic, hydraulic, or electromechanical controller that is used to modify a tension in the pair of through cables. It will be appreciated, however, that other actuators are possible and contemplated with the scope of the present disclosure.

In some cases, the actuator may be configured to adjust a tension of the cable while the array is deployed in a marine environment. For example, the actuator may be configured to receive a signal from another source, such as a vessel towing the array, or another remote source. The actuator may use the signal to adjust a tension in the cable. For example, in a first configuration, the signal may be indicative of a first desired orientation and the actuator may adjust a tension in the through cable in order for the foil section to match the first desired orientation. Likewise, in another configuration, the signal may be indicative of a second desired orientation and the actuator may adjust a tension in the through cable in order for the foil section to match the second desired orientation.

The actuator may therefore be used for dynamic or real-time, "on-the-fly" positioning of instrument of the marine array. Continuing the non-limiting illustration, the first desired orientation of the group of foil sections may correspond to a target lift generated by the foil section in order to position instruments of the array in a desired location (or submerged depth). Conditions may change in the marine environment, for example, due to unpredictable hydrodynamic forces, marine debris or obstacles, and so forth, including changes in course for the vessel itself. It may thus be desirable to reposition instruments of the array. Stated differently, it may be desirable to exert different forces on the instrument in order to account for the changing conditions.

The second desired orientation of the above illustration may correspond to such different force, and thus the actuator may help account for the changing condition. In some cases, the array may employ various sensors to detect the changing conditions. The actuator may be coupled with these sensors, and thus automatically compensate for the changing condition by altering the tension in the coupled through cables.

The foil systems of the present disclosure may serve a variety of functions in a marine array, as describe herein. For example, in one configuration, the foil sections may define a foil shape that extends substantially laterally through a marine environment. When orientated at a negative angle of attack, the foil sections may generate negative lift that biases the foil sections deeper into a marine environment. The foil section in such configuration may therefore function as a depressor that operates to maintain coupled instruments at a desired depth. As another example, in a second configuration, the foil sections may define a foil shape that extends substantially perpendicularly through the marine environment. When orientated at an angle of attack, the foil section may generate a lift that biases the foil sections laterally in the marine environment. The foil section in such configuration may therefore function as a steering or positioning device that operates to cause coupled instruments to move toward a desired position. In other configurations, other lifts may be possible, including a configurations in which the foil sections generate combination of perpendicular and lateral lifts.

In order to facilitate coupling of the foil systems described herein to various instruments of that array, the through cables may converge toward a connection point. For example, the group of foil sections may be arranged adjacent to one another to define a foil shape having a first end (e.g., a first longitudinal end) and a second end (e.g., a second longitudinal end). The through cables may extend through ducts defined in one or more of, or each of, the foil sections and converge toward one another at each of the first end and the second end. In particular, the pair of through cables may convergence toward one another at a first connection adjacent the first end of the foil shape. Likewise, the pair of through cables may converge toward one another at second connection adjacent the second end of the foil shape. The convergence of the cables may help regulate tension in the through cables, and therefore allow for more accurate or precise control of foil shape angle of attack.

The pair of through cables may converge toward a connection point adjacent an end of a foil section groups, and as such, define a triangular shape with an endmost one of the foil sections. As described herein, the triangular shape may change according to a magnitude of the tension in one or both of the through cables of the foil system. For example, the actuator may be associated with a through cable adjacent a leading edge of the foil sections, and when in a neutral or unactuated state, the through cables may form a triangle shape with the endmost foil section that substantially resembles a right triangle (e.g., with a substantially ninety degree angle formed between the leading edge through cable and the endmost foil section). As the actuator operates to decrease the tension in the leading edge cable, thereby increasing tension in the trailing edge cable (e.g., to adjust the angle of attack), the triangular shape will change, such as changing into a shape substantially resembling an isosceles triangle. Yet further, the actuator may operate to increase or decrease the tension, and further manipulate the angle defined by the leading edge through cable and the endmost foil section. This dynamic triangular shape may help facilitate fine control of the angle of attack, while also allowing the foil section angle of attack to be modified relative to other modules of a modular foil array.

For example, the convergence of the through cable may allow the foil system to be an assembly of a modular foil system. For example, as described herein, a first group of foil sections may define a first foil shape and a second, distinct group of foil sections may define a second foil shape. The first group of foil sections may be coupled to the second group of foil sections by one or more pairs of through cables that converge at a connection point positioned substantially between the distinct groups of foils. In this manner, distinct groups of foil sections may be "daisy-chained"

to one another across a span of the marine array. This may also allow for more accurate or precise control of a tension in the through cables as the tension may be adjusted in each individual "module" (e.g., adjacent each distinct group of foil sections).

Adjusting the tension in through cables adjacent individual groups of foil sections may allow for distinct angles of attack of foil sections along the modular system. For example, a first group of foil sections may have a first angle of attack based on a first tension in the through cable supporting the first foil sections in the array. Further, a second group of foil sections may have a second angle of attack based on a second, distinct tension in the through cable supporting the second foil section in the array. As such, a first portion of the modular foil system (e.g., the first group of foil sections) may generate a first lift, whereas a second portion of the modular foil system (e.g., the second group of foil section) may generate a second, distinct lift. This may allow, in some embodiments, the modular foil system to extend over a substantial span of the array, and generate specific or targeted lifts at particular areas of the array. And as described herein, the tension may be dynamically adjusted on-the-fly, and thus each portion of the modular foil system may be configured to compensate for dynamic conditions for an associated area within the array.

According to embodiments described herein, the foil systems, modular foil systems, and so on may be implemented with a marine array. A marine array may be towed through a marine environment by a vessel. In some embodiments, the marine array may be a seismic array. Broadly, a seismic array may include various sources and streamers used to study rock strata and other structures below the surface of the ocean or other bodies of water. One or more marine vessels are typically used to tow the source and/or receiver arrays in order to obtain relevant geological data covering a desired surface area of the ocean floor. For example, a single surface vessel may simultaneously tow both a source array and an array of seismic streamers, or different vessels can be used to tow separate source and receiver arrays. Alternatively, a towed source array can be used in conjunction with stationary receivers, for example, an array of ocean-bottom nodes, or with ocean-bottom cables deployed on the seabed.

Figure 14:
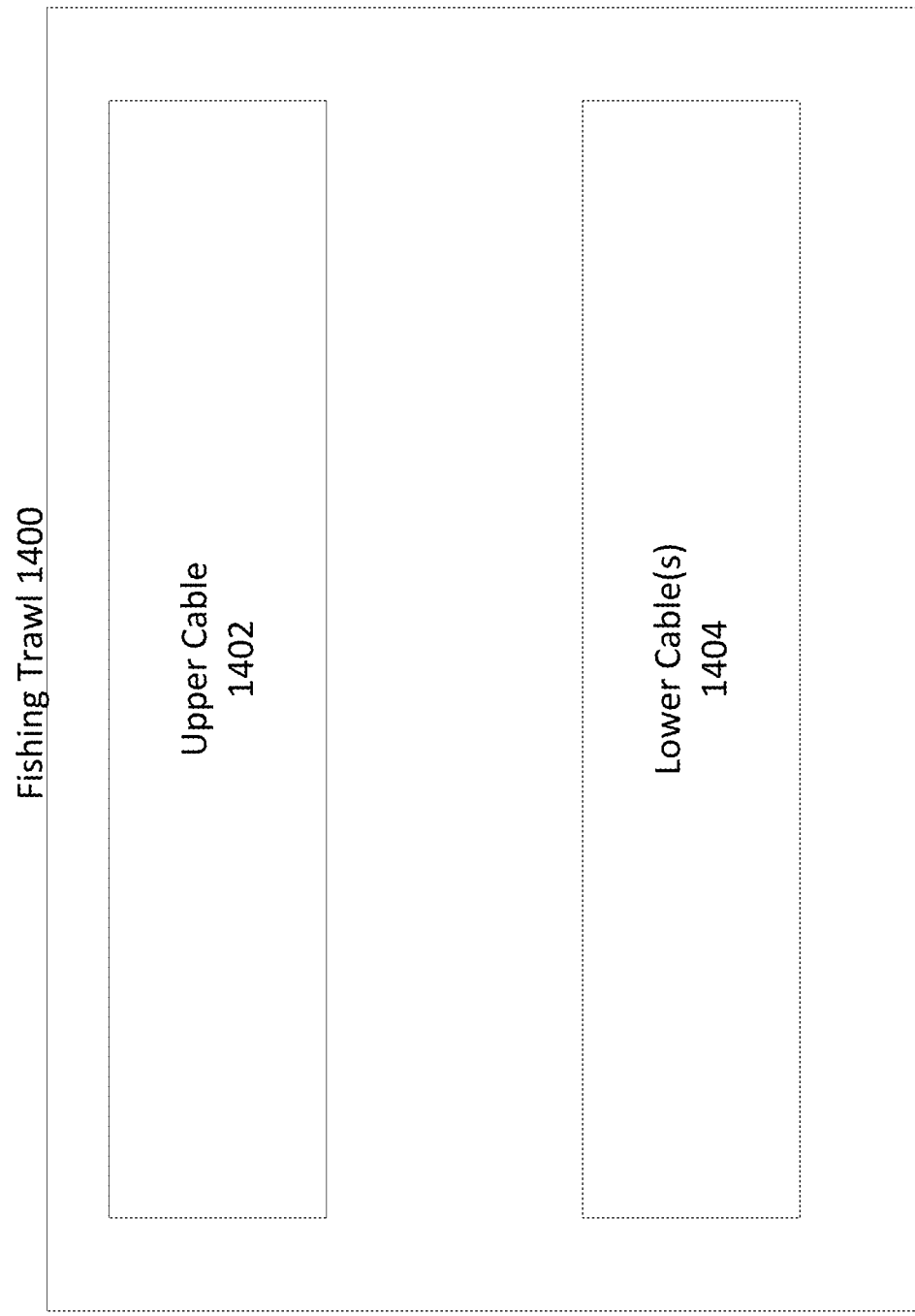
FIG. 14 depicts an example fishing trawl.

It will be appreciated that a seismic array is one application of a marine array. In other embodiments, a marine array may be, or refer to, substantially any collection of components that are towed by a vessel through a body of water. As seen in the example of FIG. 14, a marine array may include a fishing trawl 1400 that includes cables, nets, and/or other components configured to capture fish in the marine environment. The modular foil system of the present disclosure may be coupled with cables of the fishing trawl 1400 (e.g., upper cable 1402 and lower cables 1404 to widen the vertical opening of the trawl mouth, and port and starboard cables to widen the lateral opening of the trawl mouth) in order to facilitate its operation. This may include using the lift generated by the modular foil system to increase (or otherwise manipulate) a size of the mouth of the fishing trawl 1400. One or more dynamic actuators may control one or more modular foil system attached to the cables 1402, 1404 forming the mouth of the fishing trawl 1400 and steer the fishing trawl 1400 up or down and side to side. The modular foil systems can also be used to change the rate of descent and ascent of the trawl 1400 through the marine environment to increase or decrease deployment and retrieval times.

Other marine arrays are contemplated herein. In some cases, the marine array may be a towed payload used in a military application. As another example, the marine array may be a towed instrument or other payload used in oceanographic studies and the like. Accordingly, while the following figures may describe the modular foil systems in the context of a particular embodiment of a marine seismic array, this is for purposes of illustration. As such, any discussion of a modular foil system, foil section, and so on with respect to a particular embodiment of a marine array, may apply to other embodiments of marine arrays, and should not be construed as limiting.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1B:
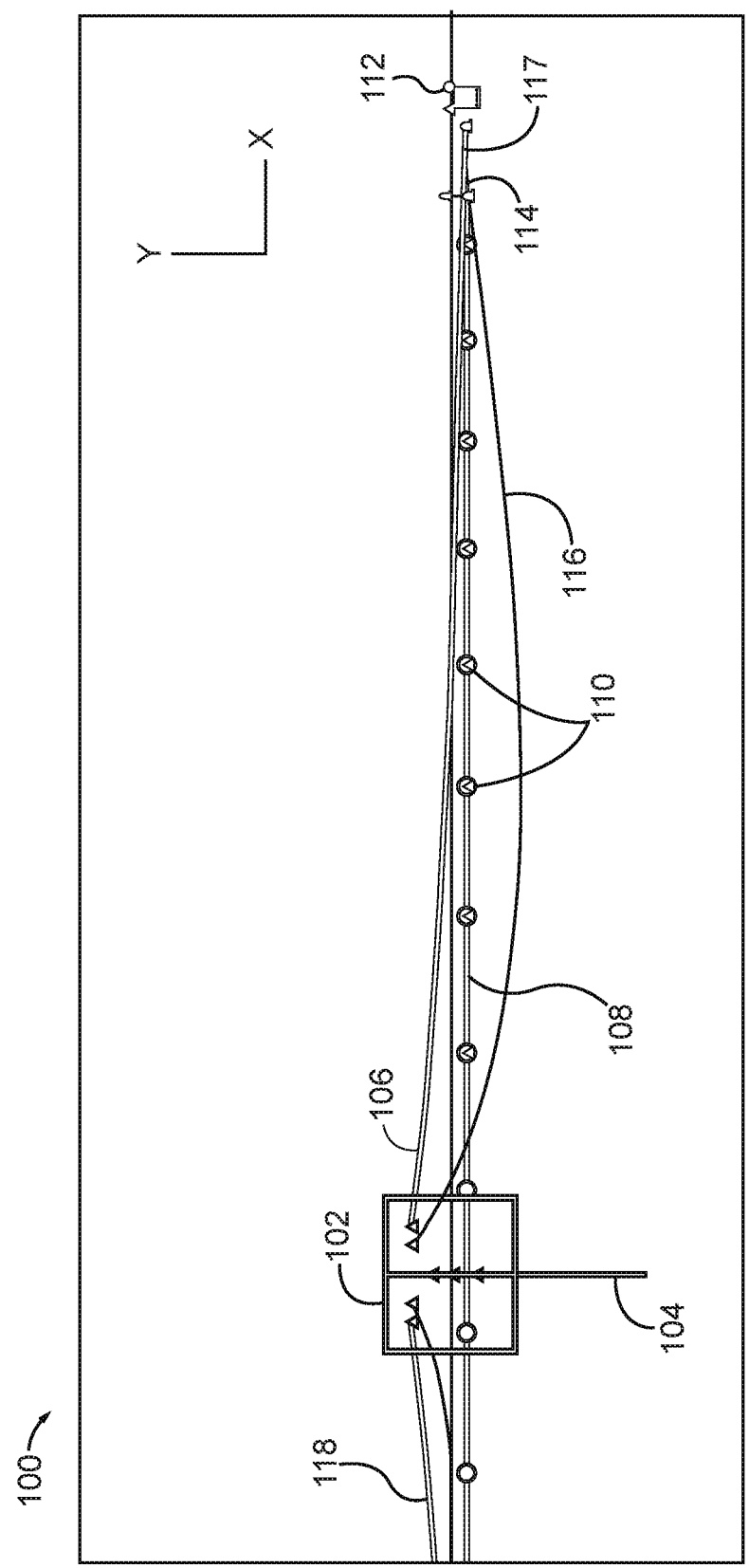
FIG. 1B depicts a rear elevation view of a schematic illustration of the towed marine array of FIG. 1A.

One embodiment of a towed three-dimensional, high-resolution, marine seismic array 100 is depicted in FIGS. 1A and 1B. The array 100 is towed by a marine vessel 102. A number of cables, ropes, or other lines may be attached to the marine vessel 102. For example, an umbilical cable 104 with acoustic signal source generators (e.g., air guns) may trail directly behind the marine vessel 102. A pair of tow ropes 106 or cables may splay out to port and starboard from the rear of the marine vessel 102. A cross-cable 108 may extend between and connect to the tow ropes 106 adjacent to the aft ends of the tow ropes 106. A number of streamer cables 110 may be connected to the cross-cable 108 at a number of locations along the length of the cross-cable 108 between the tow ropes 106. In some embodiments, the streamer cables 110 may be evenly spaced apart from adjacent streamer cables 110 along the length of the cross-cable 108. In a typical embodiment, there may be up to 18 streamer cables 110 and they may be spaced anywhere between 10 m and 100 m or more apart. Respective tail buoys 111 may be affixed to the ends of each of the streamer cables 110 which may help aid in maintaining a position of the streamer cables 110, providing a visual marker for the array, and so on.

The cross-cable 108 may extend beyond the port-most and starboard-most streamer cables 110 to attach to the tow ropes 106. These lateral sections of the cross-cable 108 may be referred to as spur lines 114. In some embodiments, the spur lines 114 may be separate ropes or cables that connect to and extend between the lateral ends of the cross-cable 108 and the tow ropes 106.

Paravanes 112 may further be attached to the tow ropes 106 at or adjacent to the connection between the tow ropes 106 and the spur lines 114 on each of the port and starboard sides. The paravanes 112 are winged hydrofoils that move outward in the water in an oblique direction to the direction of travel of the marine vessel 102, thus providing lateral spread to the cross-cable 106 and the streamer cables 110 attached thereto. In other configurations, alternative spreading devices may be employed to maintain separation of the streamer cables 110, including foil wings as described in U.S. Patent Application Publication No. US20170299747A1.

A signal cable 116 may extend from the marine vessel 102 on one side of the array 100 to connect to the cross-cable 108 and return signals received by the sensors 111 on the streamer cables 110. On an opposite side of the array 100, a recovery rope 118 may extend from the marine vessel 102 and connect with the cross-cable 108 adjacent to the last streamer 110. Surface floats 117 may be attached to the cross-cable 108 at or adjacent to the lateral ends thereof via a cable with a length corresponding to a desired depth of the streamer cables 110. The surface floats 117 act to ensure that the cross-cable 108, and thus the streamer cables 110, do not submerge too deeply when the array 100 is towed.

Unfortunately, the port and starboard ends of the cross-cable 108, and thus the streamer cables 110 attached thereto, may not achieve a desired depth beneath the surface due to the pull of the paravanes 112 on the spur lines 114. The paravanes 118 remain at the surface of the water and thus pull the lateral ends of the cross-cable upward as well as laterally outward.

Figure 2:
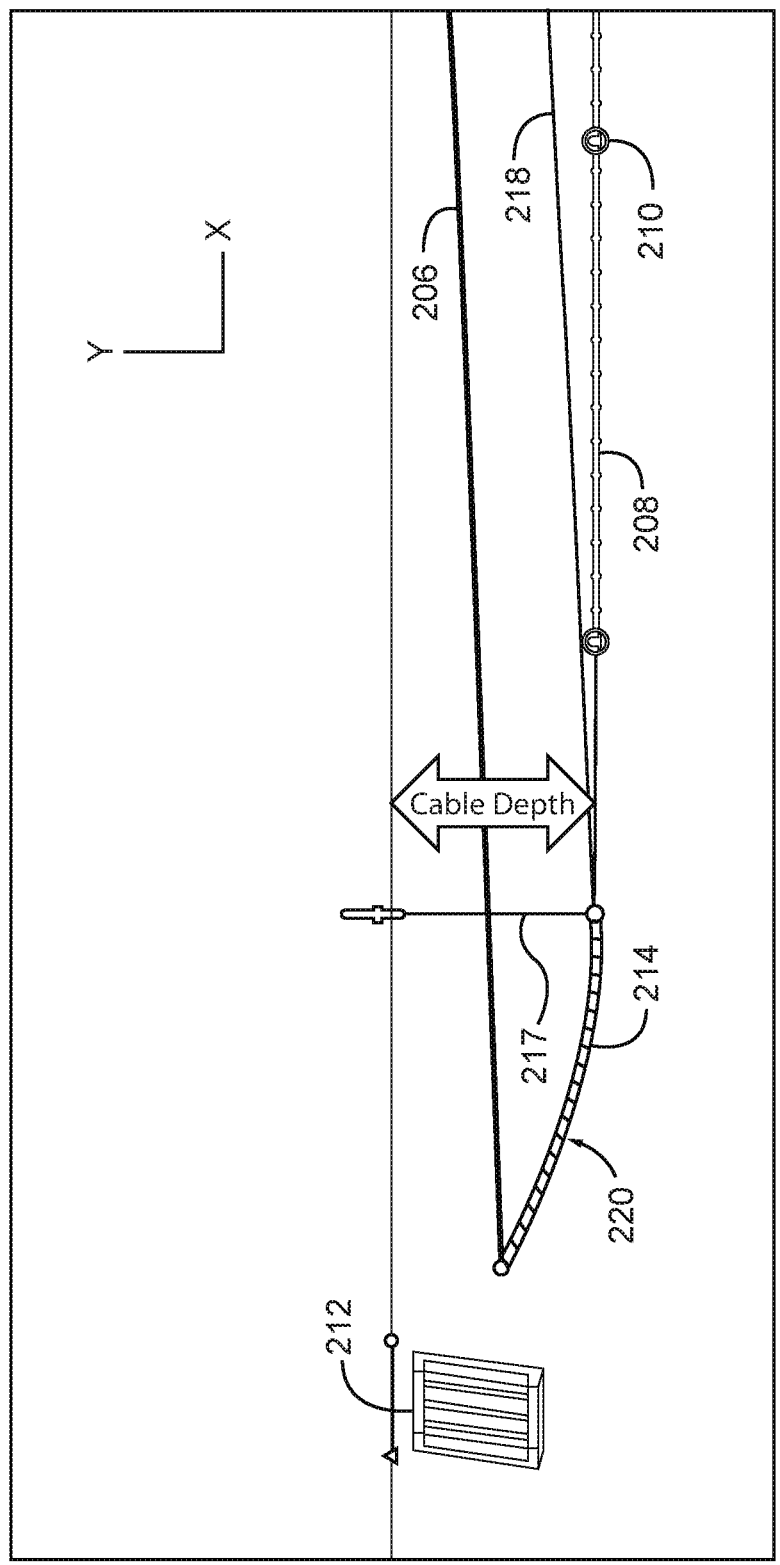
FIG. 2 depicts an enlarged, partial rear elevation view of a schematic illustration of an embodiment of the towed marine array of FIG. 1A.

To counteract the effect of the paravanes 212 on the cross cable 208, a positioning device or depressor 220 designed to provide downward lift may be attached to the cross-cable 208, the spur line 214, or both, as shown in FIG. 2. The depressor 220 may be composed of a number of foils 222 pivotably attached to the cross-cable 208 or the spur line 214. The collection of foils 222 forming depressor 220 are referred to herein as a "modular foil depressor." As shown in FIG. 2, the modular foil depressors 220 may fill the entire length of the spur line 214. Alternatively, the modular foil depressor 220 may only fill a portion of the spur line 214 and may be situated either laterally outward closer to the paravanes 212 or more inward closer to the streamer cables 210. As noted above, the modular foil depressor 220 may also be positioned on the cross-cable 208, inside the port-most and starboard-most streamer cables 210. The location of the modular foil depressor 220 may be selected based upon a number of factors including the amount of downward lift generated by the modular foil depressor 220, the separation distance of the streamer cables 210, the mass of the sensors 211, streamer cables 210, and cross-cable 208, and the lift force generated by the paravanes 212 among other factors.

Figure 3:
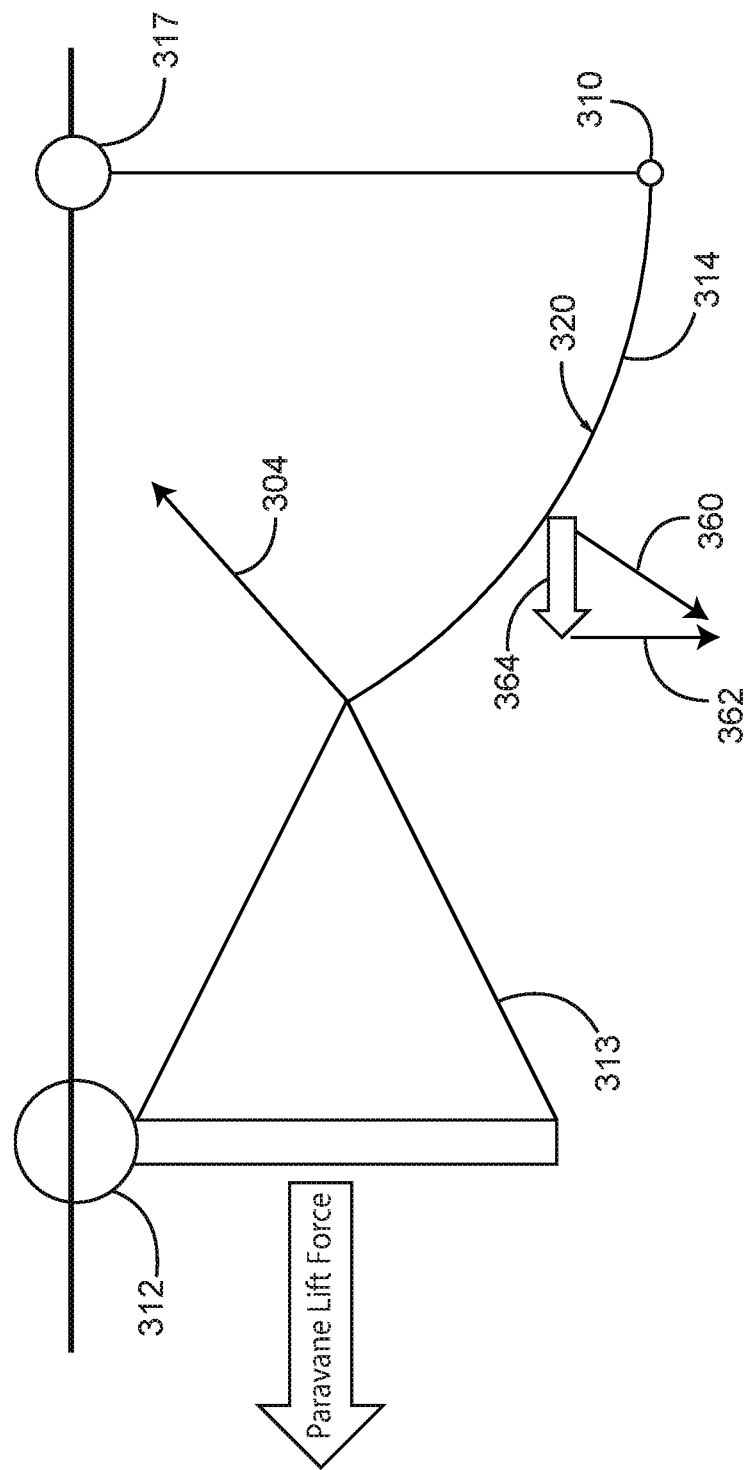
FIG. 3 depicts an enlarged, partial rear elevation view of a schematic illustration of a port side of a towed seismic array with a system of foil depressors provided on the spur line and connected to the port paravane by a bridle.

In addition to the depth control discussed, as shown in FIG. 3, a modular foil depressor 320 deployed on the spur line 314 also provides "lift assist" to the paravanes 312 attached by a bridle 313 to the intersection of the tow lines 304 and spur lines 314. That is, since the modular foil depressor 320 induces a downward catenary to the spur line 314, as shown in FIG. 3, a first component 362 of the lift force 360 acts downward as discussed above, but a second component 364 of the lift force 360 also acts horizontally (i.e. outboard). This horizontal "lift assist" of the second component 364 provided by the modular foil depressor 320 means that the existing standard paravanes 312 will now be able to spread the seismic array 300 wider than previously possible. Alternatively, the configuration including the modular foil depressor 320 on the spur line 314 may achieve the same spread but at a shorter offset behind the marine vessel towing the array 300. In another implementation, the same spread and offset may be achieved, but a more efficient setting for the bridle 313 attaching the paravanes 312 may be used and hence reduce fuel consumption of the marine vessel.

In addition to the use of a series of depressor sections on spur lines to achieve depression forces to submerge streamer heads down to desired depths for seismic arrays, the modular foil depressor may provide a number of other features and advantages.

The modular foil depressor can readily be installed on existing in-water equipment, such as, for example, by threading the individual depressor sections onto existing spur lines between paravanes and outboard streamer cable heads. Modular foil depressors may also be installed on numerous other existing ropes.

The modular foil depressor can be deployed over the side of the marine vessel, or down the gun chute, and will then self-orient and generate lift without operator intervention. Handling, deployment, and recovery operations are essentially hands-free with no special davits or dedicated winches or cranes required. It is also compact and can be easily and efficiently stowed on the vessel when onboard.

Figure 4:
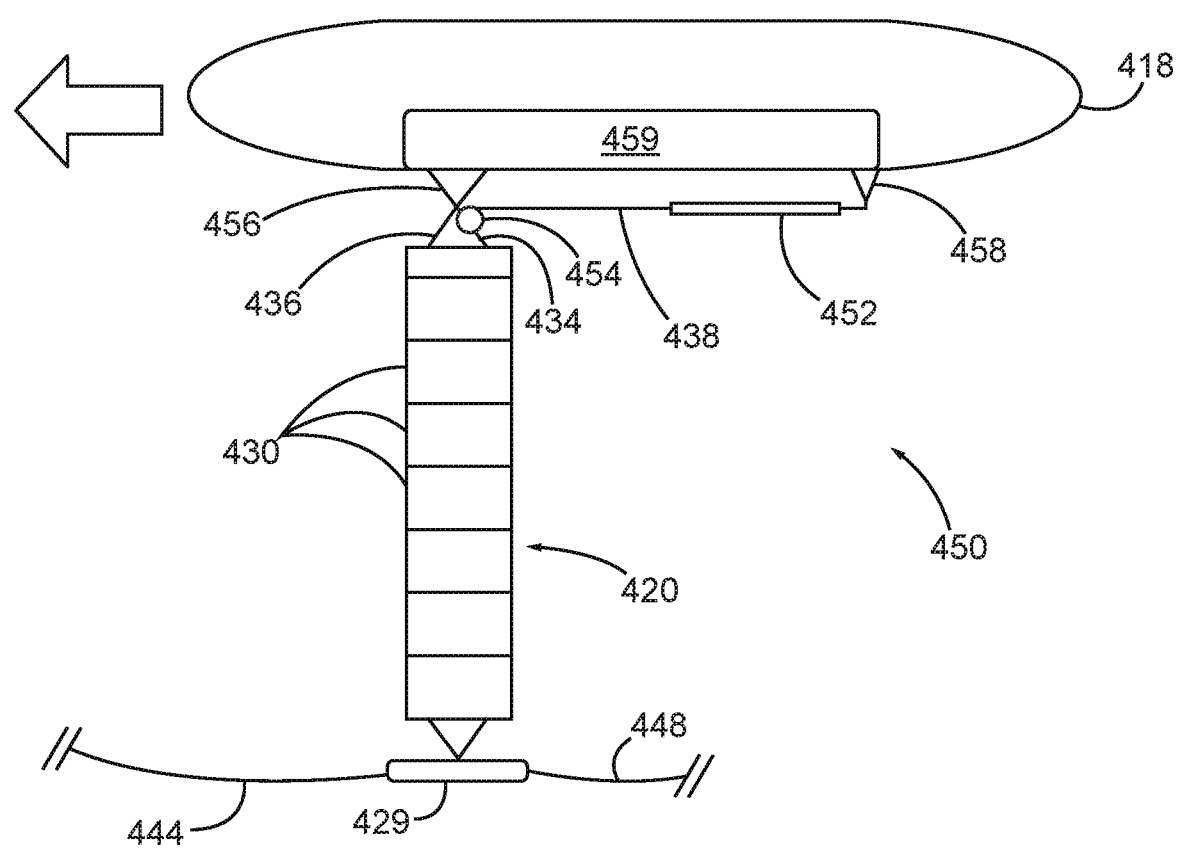
FIG. 4 depicts a schematic illustration of a cable adjustment mechanism for a foil system.

In other embodiments, a foil system may be used to generate a lift along a lateral direction. This may allow a foil system to steer or position a component of the marine array. For purposes of illustration, a schematic illustration of a dynamic wing foil system 420, composed of a number of adjacent foil sections 430, is shown in FIG. 4. The dynamic wing foil system 420 may generally extend perpendicularly into a marine environment and generate lift that is used to steer components of the array.

To facilitate the foregoing, the dynamic wing foil system 420 is shown in FIG. 4 as including a representative the adjustment mechanism 450. The adjustment mechanism 450 may include various components that may be used to manipulate the wing foil system 420, such as manipulate an orientation of the wing foil system 420 to generate a target lift when towed through the marine environment. In an embodiment, the adjustment mechanism may include a turnbuckle 452 and a pulley 454, ratchet, winch, or similar cable guide and feed mechanism may be mounted to the floatation apparatus 418, e.g., between a control cable 438 and an aft anchor point 458 on the back or rear section of the floatation apparatus 418 (in the trailing edge direction of the foil sections 430). The forward cable 436 and through cable 434 extending through the foil sections 430 are mounted to a forward anchor 456 attached to the front section of the floatation apparatus 418 (in the leading edge direction of the foil sections 430).

The adjustment mechanism 450 can be configured for adjusting either the forward cable 436 or the aft cable 438; both embodiments are encompassed. Another option is to use an adjustment mechanism 450 that provides differential adjustments to both forward and aft cabled 436, 438; e.g., by shortening one cable while lengthening the other at the same time. In some designs a single control cable may be used, extending from the forward cable anchor 456 down along a forward cable section 436, then passing through a cable return or wrapping or inflecting around a cable connector 429 attached to a submerged cable 444, and back up along an aft cable section 438 to the forward anchor 458 through the pulley 454. Alternatively, separate forward and aft control cables 436, 438 may be provided, e.g., individually attached at the submerged cable connector 429. The submerged cable 444 can be provided either as a tow line for a streamer cable 448 or as an umbilical for a source gun array.

A control device 459 for the adjustment mechanism 450 may be located at either the top or bottom end of the foil wing system 420, for example, inside the floatation apparatus 418. Suitable control devices 459 include processor, memory, and software components configured to direct the adjustment mechanism 450 to selectively vary the length and/or tension in the forward and aft cables 436, 438, in order to regulate the lift and steering forces generated by the foil wing system 420 by changing the angle of attack along individual foil sections 430. For example, the control device 459 may be configured to control an electric motor or similar drive in order to actuate the adjustment mechanism 450, providing for automated steering by adjustment of the relative length and tension in the forward and aft control cables 436, 438. Other control options include, but are not limited to, hydraulic and pneumatically controlled ram or piston mechanisms, electric winch drives, and motor-driven rack and pinion arrangements. For example, in some cases, control systems and configurations such as those described in U.S. Patent Application Publication No. US20170106946A1 may be employed to facilitate tensioning of the cables described with respect to FIG. 4.

In the context of a seismic survey as described above, a number of seismic energy source devices and/or a number of sensor nodes may be attached along the length of cables deployed and towed behind the marine vessel. Each of the cables, or the seismic equipment attached to the cables, may have a steering device associated therewith in order to adjust the position of the cable or seismic devices within the water. In some implementations, it may be very important that the towed marine equipment such as the cables with seismic equipment closely follow a predetermined course (e.g., in order to accurately map a subsurface formation). In addition, if multiple cables are deployed behind a marine vessel it may be important to maintain a constant separation distance between the cables. To meet these needs, steering mechanisms may be attached to each cable and further or alternatively attached to the equipment towed by the cable.

The foil wing systems 420 are just one exemplary implementation of a steering mechanism that may be employed to steer and position cables, seismic energy sources, sensor nodes, buoys and floats in the seismic array, etc. Other steering mechanisms for attachment to such sensor array components exist. These may include paravanes, hydrofoils, rudders, wings, elevators, and various other devices. The orientations of each of these devices while being towed through the water may be adjusted for steering. Such adjustments may be made by increasing or decreasing tension on control cables (i.e., making them more taught or more slack), engaging actuators to physically move a steering element; engaging motors to drive rotating elements, etc. In each case, the steering mechanisms are controlled by signals calculated to alter their orientation appropriately to maintain a proper course for the seismic array elements within the water. These signals are determined by sophisticated navigation and control systems that work in concert with the navigation of the marine vessel in order to ensure that the elements of the seismic array stay on course and maintain proper separation distances between adjacent elements.

FIGS. 5A-7 depict embodiments of foil systems of the present disclosure. In particular, FIGS. 5A-7 depict embodiments of foil systems that define a group foil shape configured to have an adjustable angle of attack or orientation. In this regard, the foil system or systems of the present disclosure may generate a variety of distinct lifts based on the adjustable angle of attack of the group foil shape. It will be appreciated that that foil systems and configurations described with respect to FIGS. 5A-7 may be used with any of the marine arrays described herein. In this regard, the foil systems described with respect to FIGS. 5A-7 may be used as, or define a component or assembly of, a modular foil depressor (e.g., depressor 220 of FIG. 2), a wing foil system (e.g., wing foil system 420 of FIG. 4), and so forth as may be appropriate for a given application.

Figure 5A:
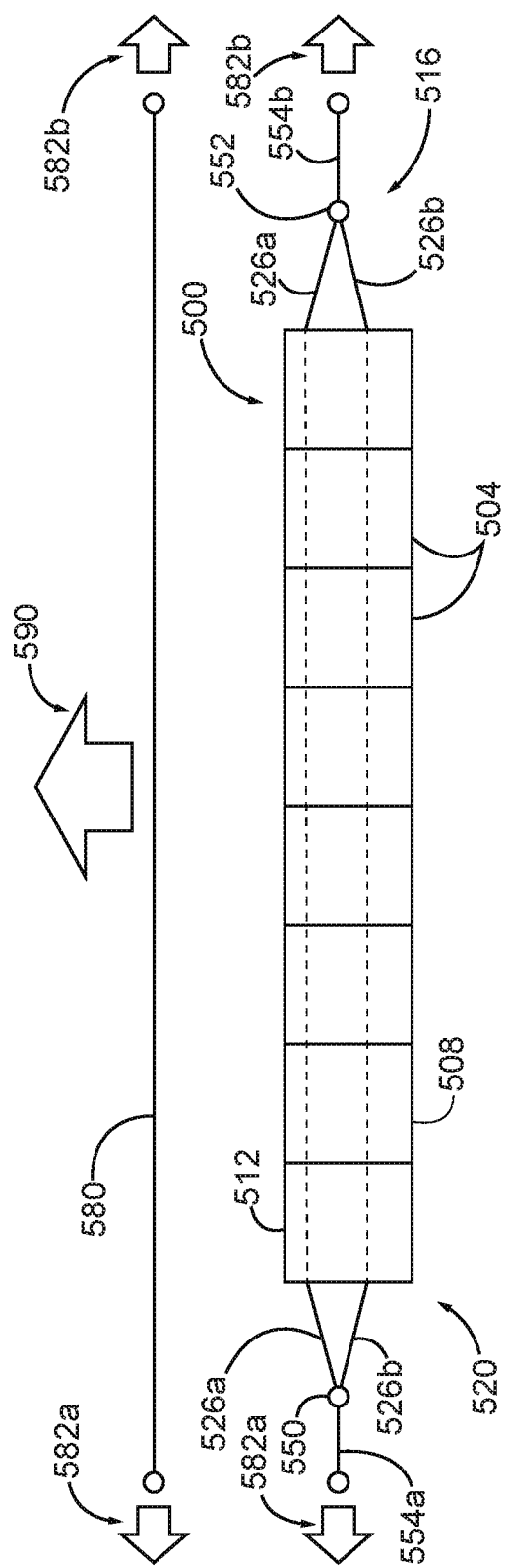
FIG. 5A depicts a schematic illustration of another embodiment of a foil system of the present disclosure.

With reference to FIG. 5A, a tensioned cable 580 is shown. The tensioned cable 580 may be any appropriate cable of a marine array, such as a cable that is in tension and forming a component of a seismic array or fishing trawl assembly, among other applications. The tensioned cable 580 is shown towed along a direction of tow 590. At a first end, the tensioned cable may be tensioned in a first tensioning direction 582*a*. At a second end, opposite the first end, the tensioned cable may be tensioned in a second tensioning direction 582*b*.

FIG. 5A further shows a foil system 500, which is further depicted in different variations of deployment in FIGS. 5B-5F. The foil system 500 may be coupled with, or substantially replace, the tensioned cable 580. This may allow the foil system to provide lift to the portion of the marine array associated with the tensioned cable 580. The foil system 500 may include a number of foil sections 504. Each foil section 504 has a span, a chord, and a foil cross-section, which may be a standard hydrofoil cross-section, as shown and described further herein with respect to FIGS. 8A and 8B, or may be any other desired foil cross-section, such as NACA, Eppler, Gottingen, or any other custom foil cross-section suitable for the desired application.

The foil sections 504 may be arranged or stacked adjacent one another. In this regard, the foil sections 504 may be a group of foil sections that collectively define a foil shape. The foil shape may have a leading edge 512 and a trailing edge 508. The foil shape of the foil system 500 may be arranged at a variety of orientations or angles of attack relative to a direction of a flow, for example, as described in greater detail below with respect to FIGS. 6A and 6B. This may cause the foil system 500 to generate lift that is used to manipulate components of a marine array (e.g., seismic cables, receivers, and so on) in order to steer, move, position, and/or depress the components, as may be appropriate for a given application.

In the embodiments of FIGS. 5A-5F, the foil sections 504 are coupled to one another using a pair of through cables, such as a first through cable 526*a* and a second through cable 526*b*. The first through cable 526*a* and the second through cable 526*b* may extend through the foil sections 504, thereby supporting the foil sections 504 within the foil system 500. As one example, the foil sections 504 may define ducts that extend through the foil sections 504. The ducts may extend along and just aft of each of the leading edge 512 and just forward of the trailing edge 508 of the foil shape. The first through cable 526*a* and the second through cable 526*b* may therefore be positioned within and threaded through the ducts of the foil section 504. In turn, the first through cable 526*a* and the second through cable 526*b* may be coupled to another component or assembly of a marine array, and thereby help support the foil sections 504 with the array.

In the embodiment of FIGS. 5A-5F, the first through cable 526*a* and the second through cable 526*b* may couple the foil sections 504 to connection points within a marine array. In a particular embodiment, FIG. 5A shows a first connection point 550 and a second connection point 552. The first connection point 550 and/or the second connection point 552 may be a hook, a tie, a pulley, a fixed connection, and so on of the marine array; however, other configurations are possible. The connection points 550, 552 may generally define a module of a modular foil system (e.g., such as that described in greater detail with respect to FIG. 7) and, as such, other groups of foil sections 504 may be connected to one another at the connection points 550, 552.

Each of the connection points 550, 552 may be coupled with distinct connection cables. This may allow the foil system to be coupled to substantially any other cable, rope, assembly and so on of the marine array, including components of seismic array, a fishing trawl, and so on. For example, FIG. 5A shows a first connection cable 554*a* and a second connection cable 554*b* that are coupled to respective ones of the connection points 550, 552. In turn, the first connection cable 554a and the second connection cable 554b may be coupled to other components of the marine array, according to embodiment described herein.

In the embodiment shown in FIGS. 5A-5F, the through cables may converge at the connection points adjacent opposing ends of the foil sections. For example, the first through cable 526a and the second through cable 526b may converge toward the first connection 550. Also, the first through cable 526a and the second through cable 526b may converge toward the second connection 552. This may allow for more precise or accurate control of an orientation of the foil sections.

For example, the first through cable 526a may extend from the first connection point 550 to the second connection point 552. Between the first connection point 550 and the second connection point 552, the first through cable 524a may extend through a duct of the foil sections 504 (e.g., a duct defined along and just aft of the leading edge 512). The second through cable 526b may extend from the second connection point 550 to the second connection point 552. Between the first connection point 550 and the second connection point 552, the second through cable 526b may extend through a duct of the foil sections 504 (e.g., a duct defined along and just forward of the trailing edge 508).

Accordingly, a position or orientation of each foil section 504 may be defined (or constrained by) the through cables 526a, 526b. For example, each foil section 504 may be subjected to dynamic hydrodynamic forces and thus move relative to one another. When the through cables 526a, 526b are substantially slack or otherwise permit movement between each of the foil sections 504, each foil section 504 may migrate apart from one another. However, by applying tension in one or both of the cables 526a, 526b, the cables 526a, 526b may form a triangular shape that may act to constrain the movement of foil sections 504 relative to one another. The increased tension may also help each foil section 504 to stack adjacent to one another, for example, in order to define the foil shape having the leading edge 512 and the trailing edge 508. In some cases, one or both of the cables 526a, 526b may be tensioned in order to define a catenary of the foil shape.

In certain embodiments, the tension may be increased in one or both of the through cables 526a, 526b in order to adjust an angle of attack of the foil shape. As one possibility, a tension in one or both of the through cables 526a, 526b may be increased, which, in turn, may increase an angle of attack of the foil shape defined by the foil sections 504. The increased angle of attack may generally cause the foil system 500 to generate additional lift. As such, the tension of one or both of the through cables 526a, 526b (or any other cables or ropes supporting the foil sections 504 within the array) may be adjusted in order to manipulate lift generated by the foil system 500.

To facilitate the foregoing, FIGS. 5B-5F depict embodiments in which the first and second through cables 524a, 524b converge at the connection points 550, 552, which are adjacent opposing ends of the foil system 500. Converging the through cables 524a, 524b toward common connection points 550, 552, may allow an actuator to control the tension in one or both of the through cables 524a, 524b in a precise, accurate, and potentially dynamic manner.

Figure 5B:
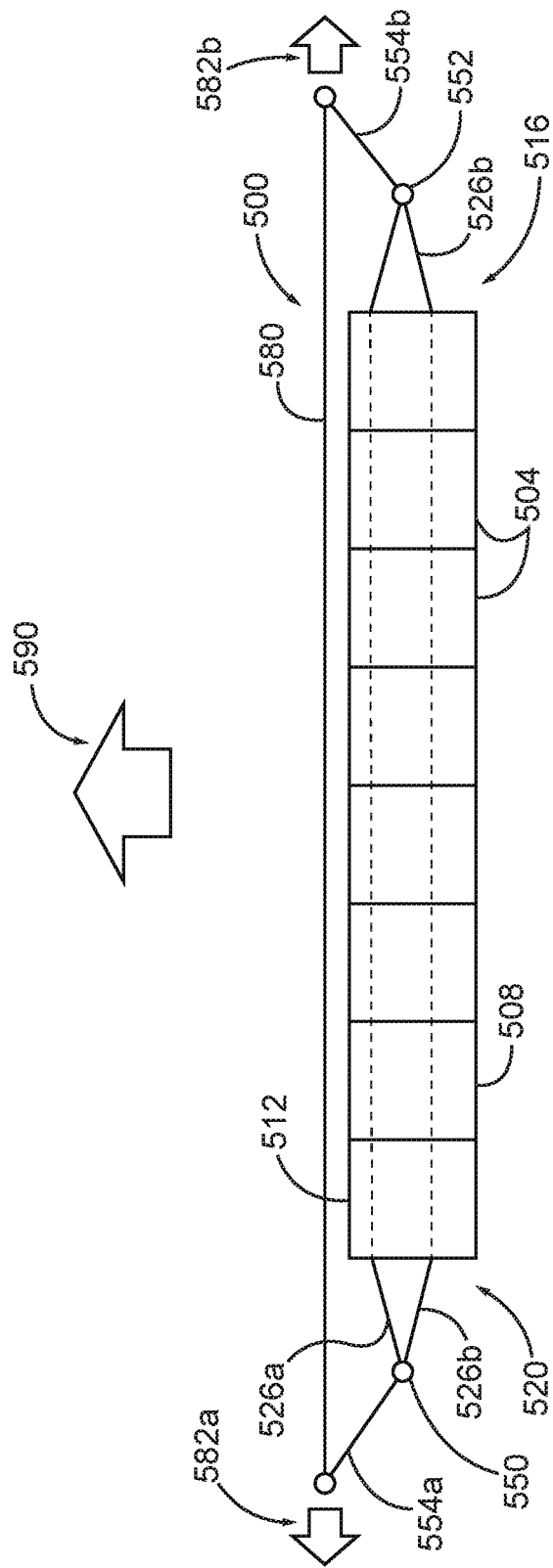
FIG. 5B depicts a schematic illustration of another embodiment of a foil system of the present disclosure.

With particular reference to FIG. 5B, the tensioned cable 580 is arranged substantially parallel to, and connected with, the foil sections 504. In this regard, the foil system may be "piggy-backed" onto an existing high-tensioned cable (e.g., tensioned cable 580) for installation into a marine array, including any of the seismic arrays, fishing trawls, military vessels, and so on, described herein.

For example, the tensioned cable 580 may be a cable of a marine array and the foil system 500 may be coupled with the tensioned cable 580 to provide lift at a target region of the array. As shown in FIG. 5B, the first connection cable 554a may be coupled with the tensioned cable 580 at a first end. Further, the second connection cable 554b may be coupled with the tensioned cable 580 at a second end. In this manner, the foil sections 504 may generate lift, as described herein, that in turn lifts the tensioned cable 580 in a specified manner. Lift may therefore be delivered to a particular region of the marine array by attaching the foil system 500 to existing structures and components of the array, rather than modifying components of the array to accommodate the foil system.

Figure 5C:
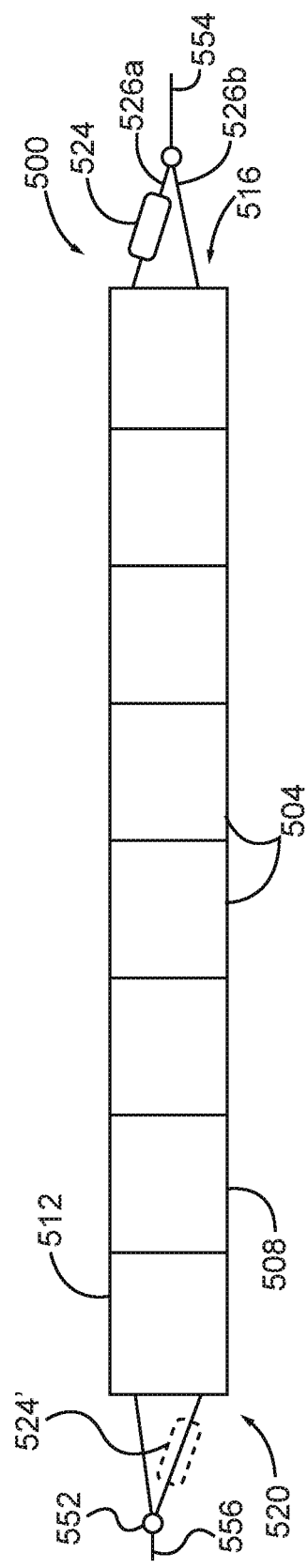
FIG. 5C depicts a schematic illustration of another embodiment of a foil system of the present disclosure.

With reference to FIG. 5C, another embodiment of the foil system 500 is shown in which the foil system 500 includes an actuator 524. The actuator 524 may be used to adjust a tension in one or both of the first through cable 526a or the second through cable 526b, which, in turn, may adjust an angle of attack of a foil shape defined by the foil section 504. The actuator 524 is shown in FIG. 5C as coupled to or positioned on the first through cable 524a at a first end 516 of the foil system 500. Positioning the actuator 524 on the first through cable 526a may help orientate the leading edge 512 in one or more directions in order to generate a target lift for the foil system 500. In other cases, actuators may be arranged at various other positions of the foil system 500, including being positioned on the second through cable 524b, for example, as shown with another actuator 524' (shown in phantom).

The actuator 524, may be substantially any appropriate component that is used to adjust a tension in a cable. For example, the actuator may be a mechanical component, such as a turnbuckle. The turnbuckle may be manually adjusted, for example, prior to deployment of the array, in order to set a desired angle of attack of the foils. Additionally or alternatively, the foil system may include various dynamic actuators, such as a pneumatic or electromechanical controller that is used to modify a tension in the pair of through cables, for example, as described in U.S. Patent Application Publication No. 20170106946A1. It will be appreciated, however, that other actuators are possible and contemplated with the scope of the present disclosure.

In some cases, the actuator may be configured to adjust a tension of the cable while the array is deployed in a marine environment. For example, the actuator may be configured to receive a signal from another source, such as a vessel towing the array, or another remote source. The actuator may use the signal to adjust a tension in the cable. For example, in a first configuration, the signal may be indicative of a first desired orientation and the actuator may adjust a tension in the through cable in order for the foil section to match the first desired orientation. Likewise, in another configuration, the signal may be indicative of a second desired orientation and the actuator may adjust a tension in the through cable in order for the foil section to match the second desired orientation. In this regard, the actuator 524 may, more broadly, be a component of the adjustment mechanism (e.g., adjustment mechanism 450 of FIG. 4) or other steering or positioning system described herein.

Figure 5D:
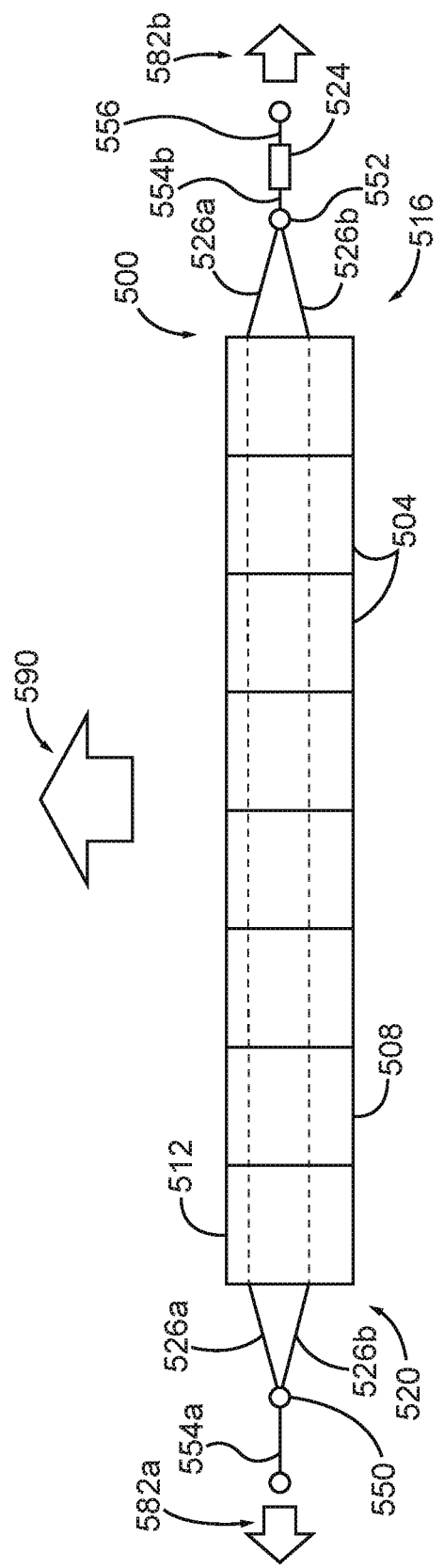
FIG. 5D depicts a schematic illustration of another embodiment of a foil system of the present disclosure.

With reference to FIG. 5D, another embodiment of the foil system 500 is shown. In the embodiment of FIG. 5D, the actuator 524 is shown connected to the second connection cable 554b. It will be appreciated that the second connection cable 554b is a continuation of one of the first or second through cables 526a, 526b. By connecting the actuator 524 to the second connection cable 554b, the actuator 524 may be positioned outside of the triangle formed by the first and second through cables 526a, 526b. By positioning the actuator outside of the triangle formed by the through cables 526a, 526b, an angle of attack of the foil section 504 may be manipulated in a controlled manner, in certain embodiments. For example, in the embodiment of FIG. 5D, the actuator 524 functions as an external tensioning member and therefore operates to control an angle of attack of the foil section 504 in a manner that is different from that of the internal tension member configuration described herein.

Figure 5E:
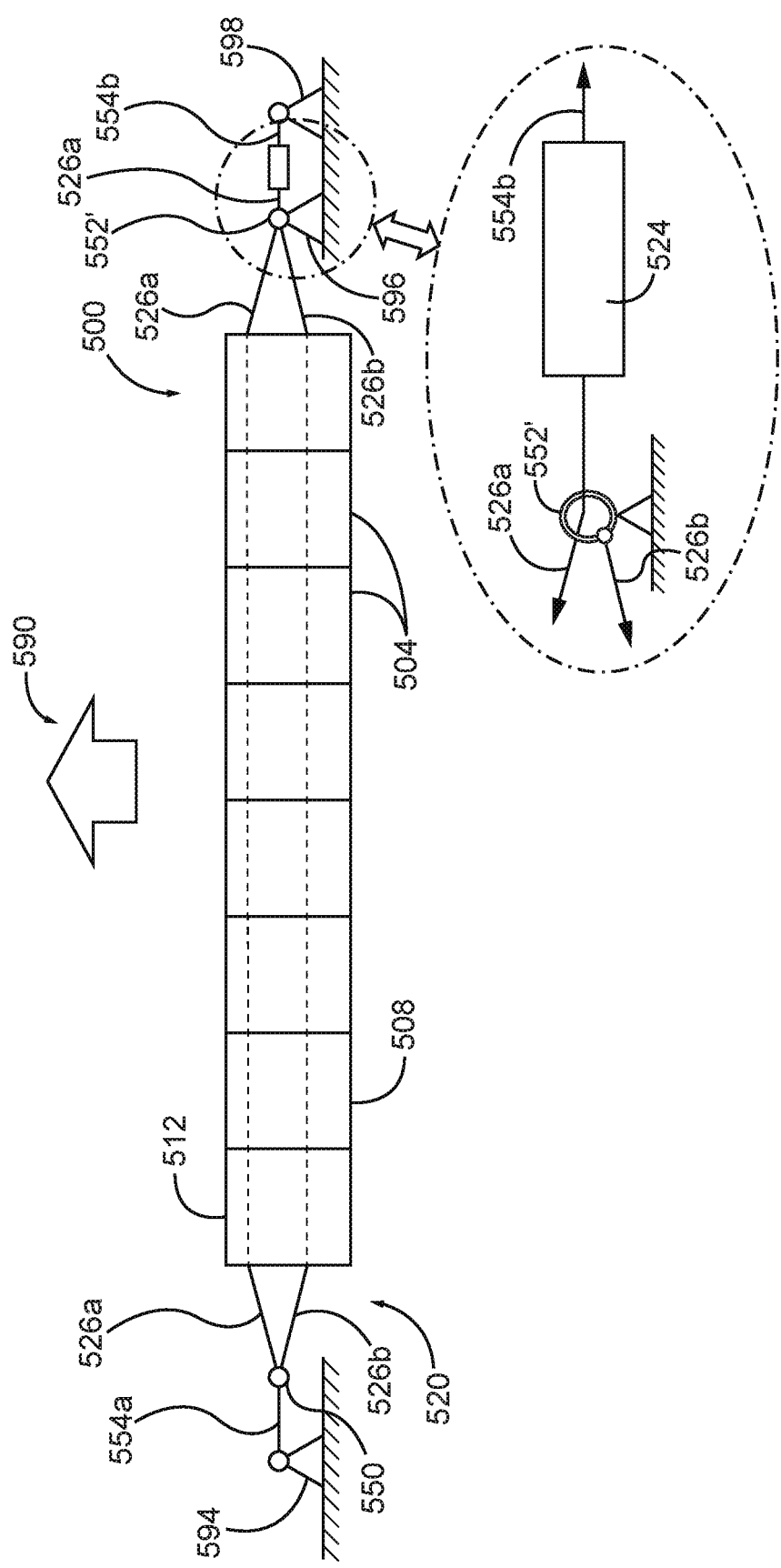
FIG. 5E depicts a schematic illustration of an implementation of the foil system of FIG. 5D.
Figure 5F:
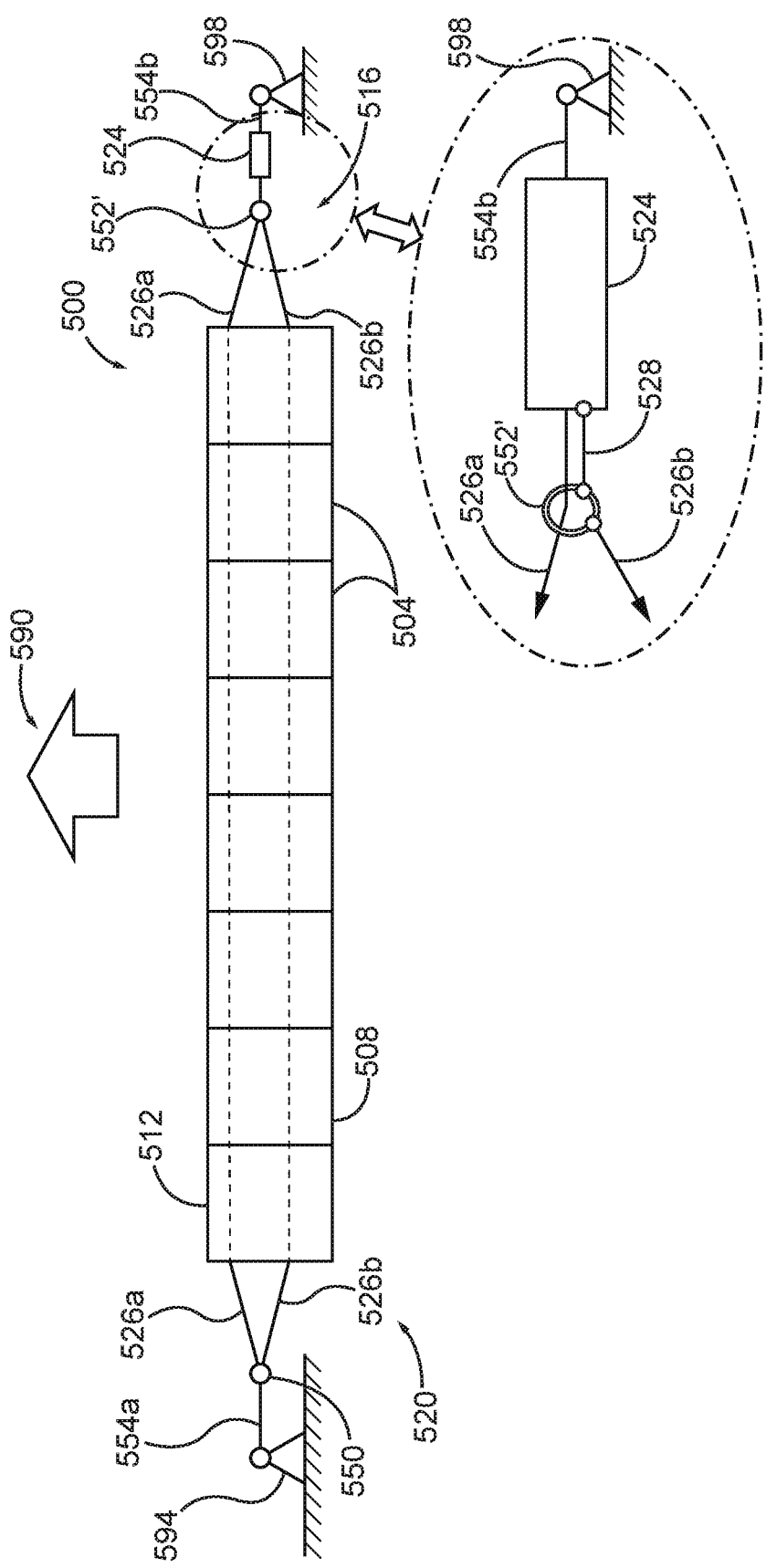
FIG. 5F depicts a schematic illustration of an implementation of the foil system of FIG. 5D.

To facilitate the foregoing, FIGS. 5E and 5F provide further implementation details of the system shown in FIG. 5D. For example, FIG. 5E shows the foil system 500 having the external tension member described with respect to FIG. 5D having three anchor points. By way of illustration, a first anchor point 594 is positioned adjacent to a first end 520 of the foil system 500. A second anchor point 596 and a third anchor point 598 are positioned adjacent to a second end 516 of the foil system 500. Each of the anchor points may represent a region or point of a marine array that is "fixed" with respect to the foil system 500, for example, such that movement of the cable or other associated component is constrained. At the first end 520, the foil system 500 may be connected to the first anchor point 594 by cable 554a. And at the second end 516, the foil system 500 may be connected to the second anchor point 596 by cable 554b and to the third anchor point 598 by another connecting cable 556.

The second anchor point 596 and the third anchor point 598 may help arrange the actuator 524 within the foil system 500. For example, the actuator 524 may be positioned substantially between the second anchor point 596 and the third anchor point 598. This may allow the actuator to be connected with one of the through cables 526a, 526b and define an external tensioning member for the foil system 500.

In the embodiment of FIG. 5E, the actuator 524 is connected with the first through cable 526a. As shown in the detail of FIG. 5E, the first through cable 526a and the second through cable 526b may each converge toward a connection point defined at the second anchor point 596. At the second anchor point 596, a ring 552' may be positioned for engaging each of the first through cable 526a and the second through cable 526b. In the embodiment of FIG. 5E, the second through cable 526b may terminate or be tied off at the ring 552'. The first through cable 526a, however, may be engaged with the ring 552', such as extending through the ring 552' and continue beyond the second anchor point 596 for connection with the actuator 524. As shown in FIG. 5E, a connection cable 554b may connect the actuator 524 to the third anchor point 596.

FIG. 5F shows another example implementation of the actuator 524 as an external tension member. For example, FIG. 5F shows the foil system 500 having an external tensioning member described with respect to FIG. 5D and having two anchor points. In this regard, the embodiment of the foil system 500 of FIG. 5F may be substantially analogous as that shown with respect to FIG. 5E. Notwithstanding, as shown in the detail of FIG. 5F, the ring 552' may be uncoupled with a fixed connection, such as the second anchor point 596 of FIG. 5E. In this regard, a connection cable 528 may be employed in order to connect the ring 552' to the actuator 524 and stabilize a position of the ring 552' along the first through cable 526a.

Figure 6A:
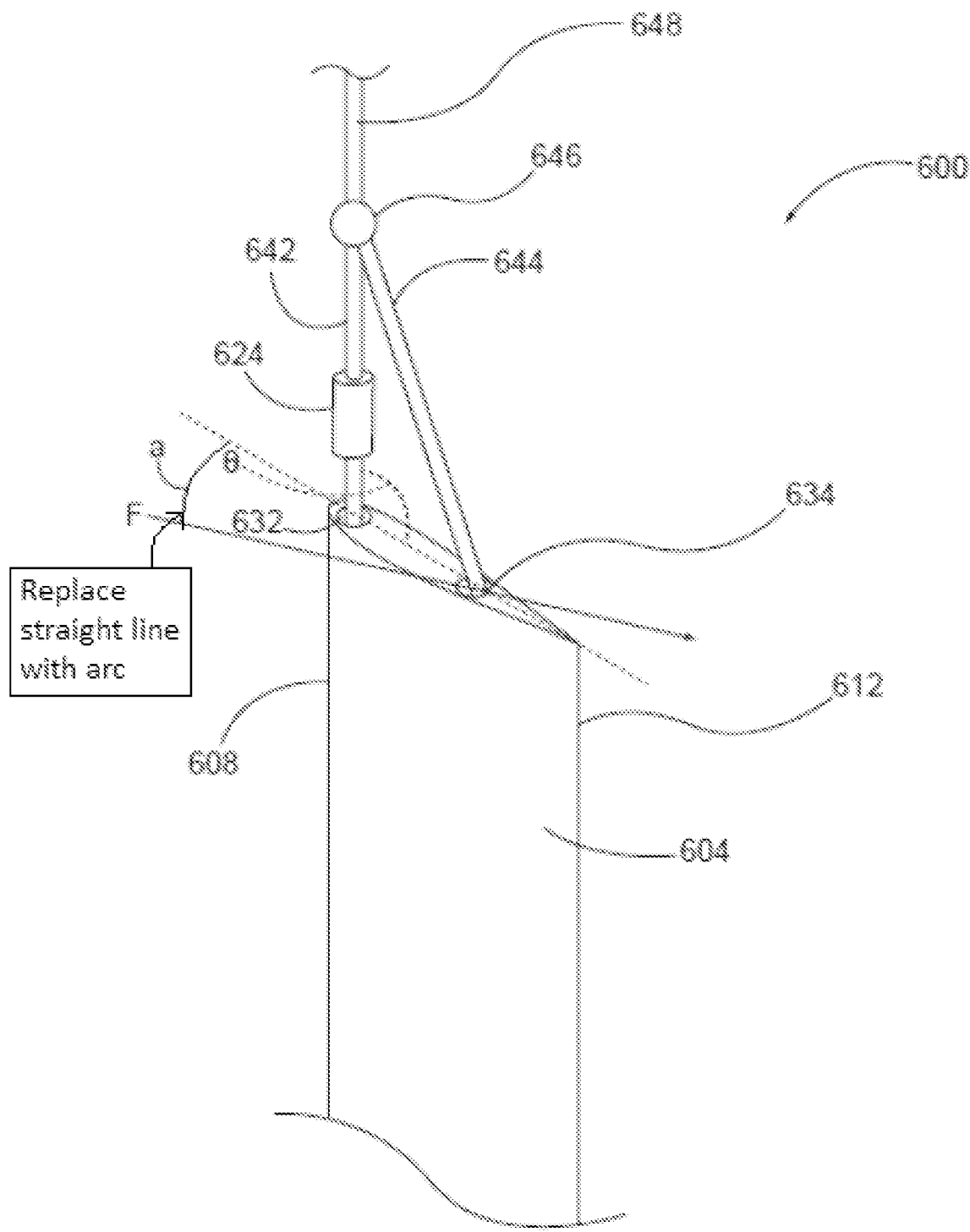
FIG. 6A depicts a perspective view of a foil system having a first angle of attack.
Figure 6B:
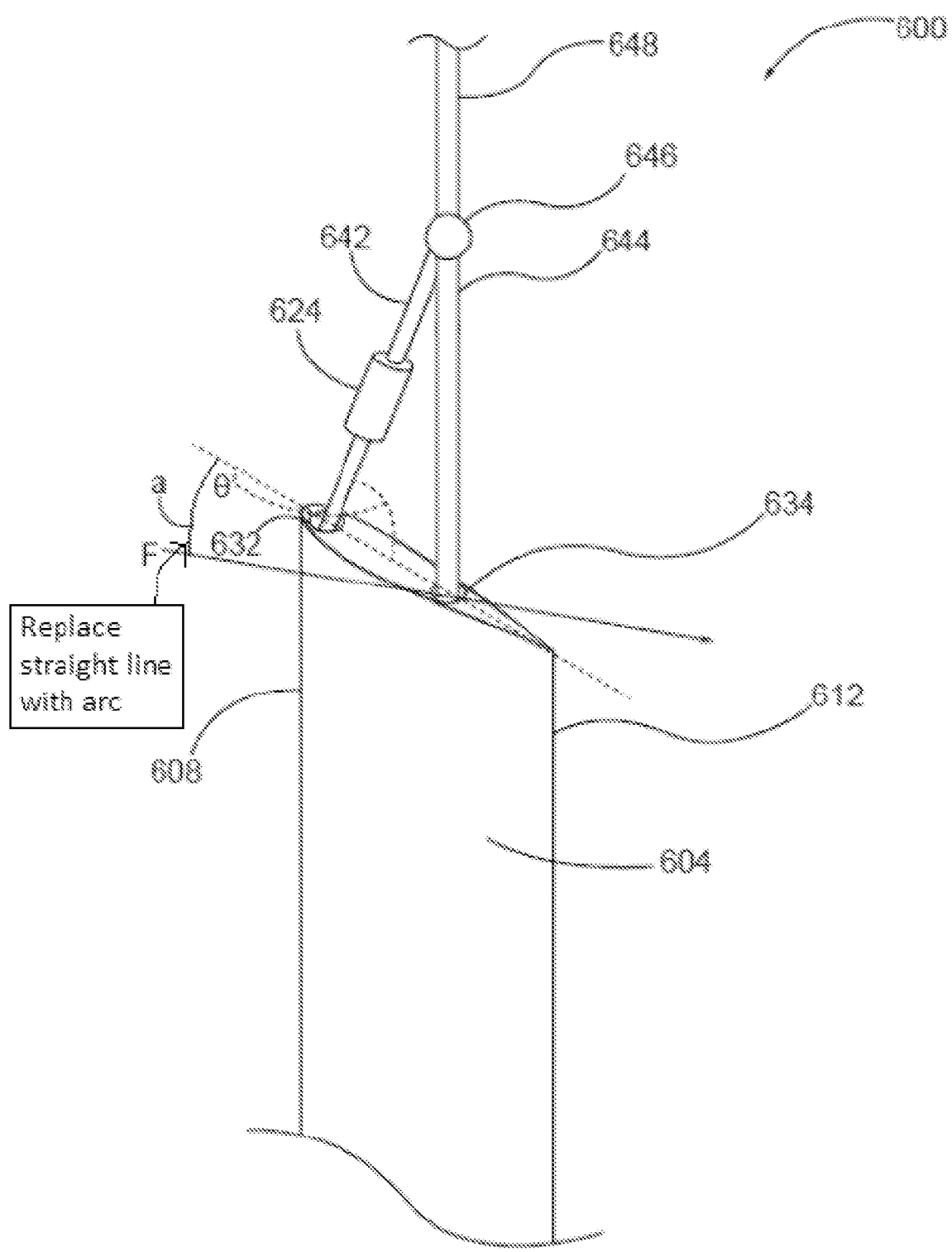
FIG. 6B depicts a perspective view of the foil system of FIG. 6AB having a second angle of attack.

FIGS. 6A and 6B depict a perspective view of foil system 600. The foil system 600 may be substantially analogous to any of the foil systems described herein, such as the foil system 500 of FIG. 5. In this regard, the foil system 600 may be configured to generate lift in a marine environment and may include: foil sections 604, a leading edge 608, a trailing edge 612, a first through cable 642, a second through cable 644, a connection point 646, and an actuator 624. Redundant explanation of such components is omitted here for clarity.

FIGS. 6A and 6B also depict the foil section 600 having a first duct 632 and a second duct 634. The first through cables 642 may be positioned within and threaded through the first duct 632, and the second through cable 644 may be positioned within and threaded through the second duct 634. As shown in FIGS. 6A and 6B, the first through cable 642 and the second through cable 644 may converge toward the connection point 646. This may facilitate adjusting a tension in one or both of first through cable 642, 644, as described herein. Extending from the connection point may be an attachment cable 648. The attachment cable 648 may be a component or assembly of a marine array, such as the seismic arrays described herein. In other cases, such as that described with respect to FIG. 7, the cable 648 may be a connection to, or be used to connect, the foil system 600 with other foil systems in order to form a modular foil system.

FIGS. 6A and 6B depict the foil system 600 in embodiments in which an angle of attack (a) of the foil system 600 is adjustable and may be adjusted. For example, as described herein, a tension in one or both of the through cables of 642, 644 may be adjusted by the actuator 624. The adjustment in tension may cause the foil section 604 to alter an angle of attack relative to a flow F.

FIGS. 6A and 6B also depict a change in a triangular shape formed by the through cables 642, 644, and an end of the foil section 604 adjacent the connection point 646. As described herein, the triangular shape may change according to a magnitude of tension in one or both of the through cables 642, 644. In the examples shown in FIGS. 6A and 6B, the actuator 624 is associated with the first through cable 642. In a neutral or unactuated state, the first through cable 642 may form a substantially ninety degree angle (e.g., 0) with the end of the foil section 604, and thus the triangular shape may resemble a right triangle. As the actuator 624 operates to decrease tension exhibited by the first through cable 642, the triangular shape may change, for example, such as by representing an isosceles triangle. As is evidenced by the changing form of the triangular shape, an angle of attack of the foil system 600 may be modified without reliance on, or substantially unhindered by, adjacent foil systems or other components of the seismic array, and so on.

With reference to FIG. 6A, the foil system 600 is shown at a first angle of attack α. For example, the actuator 624 may adjust the tension in one or both of the first through cable 642 or the second through cable 644. The adjustment may be an increase in tension, for example, from a slack or equilibrium tension, which in turn causes individual foil sections 604 to orientate at the angle α from the direction of the flow F.

When arranged at the first angle of attack α, the foil system 600 may generate a first lift. For example, the foil sections 604 may be a standard NACA or other foil shape, as described herein, and as such, when orientated at the angle of attack α, the foil sections 604 may generate the first lift. The first lift may be a lift that is targeted to steer, position, and/or otherwise maintain or manipulate components or assemblies of a marine array. In this regard, the actuator 624 may be coupled with either the first through cable 642 or the second through cable 644, and adjust the tension in one or both of the first through cable 642, or the second through cable 644 such that the foil system 600 generates the required lift.

As shown in FIG. 6A, when the foil system 600 is arranged at the first angle of attack α, the first through cable 642 may generally form an angle θ with the adjacent end of the foil section 604. While the angle θ is shown in FIG. 6A as being substantially ninety degrees, it will be appreciated that angles of various magnitudes are possible, for example, based on a tension in the first through cable 642.

Accordingly, the actuator 624 may be a dynamic actuator that is configured to adjust the tension in one or both of the first through cable 642 and the second through cable 644 in response to a signal. The signal may be from another source, such as a vessel, that causes the actuator 624 to adjust the tension in one or both of the through cables 642, 644 to a certain value. Additionally or alternatively, the actuator 624 may be responsive to dynamic conditions and operate to facilitate maintenance of the foil system 600 along a desired course or position. For example, various sensors may be integrated with the foil system 600, including within the foil sections 604, and output various data such as position and speed of the foil system in addition to information concerning, for example, a marine environment, such as pressure, temperature, currents, and so forth. Such data from sensors incorporated with the foil system 600 may be used by the actuator 624 (or other associated system) in order to manipulate the foil system 600. To illustrate, such sensors may detect that the foil system 600 is undesirably positioned within a marine array (e.g., due to unanticipated hydrodynamic forces). In turn, a processing element, controller, and so forth (local and/or remote) may determine a new target lift for the foil system 600 to generate in order to obtain its desirable position. The actuator 624 may receive information regarding the new target lift and adjust the tension in one or both of the through cables accordingly.

In this regard, with reference to FIG. 6B, the foil system 600 is shown at a second angle of attack α'. At the second angle of attack α', the foil system 600 may generate a second lift. The second lift may be the new target lift, for example, described above with respect to the operation of the actuator 624 in FIG. 6A. In other cases, the second lift may be desired or predetermined lift for the marine array.

To facilitate the foregoing, the actuator 624 may be coupled with either the first through cable 642 or the second through cable 644, and adjust the tension in one or both of the first through cable 642 or the second through cable 644. The adjustment may be an increase in tension, for example, from a tension of the cables of FIG. 6A. In turn, this may cause individual foil sections to orientate at a greater angle relative to the flow F than that shown above with respect to FIG. 6A. Accordingly, the second lift may be greater than the first lift, and thus used to steer, position, and/or otherwise maintain or manipulate components or assemblies of a marine array in a manner distinct from the first lift.

As shown in FIG. 6B, when the foil system 600 is arranged at the second angle of attack α', the first through cable 642 may generally form an angle θ' with the adjacent end of the foil section 604. While the angle θ' is shown in FIG. 6B as being an acute angle, it will be appreciated that angles of various magnitudes are possible, for example, based on a tension in the first through cable 642.

As described above with respect to FIG. 6A, the actuator 624 may be a dynamic actuator or otherwise configured to adjust a tension in one or both of the first through cable 642 or second through cable 644 when the foil system 600 is submerged or deployed in the marine array. Accordingly, while the actuator 624 is described above as increasing a tension in the first through cable 642 or second through cable 644, it will be appreciated that the actuator 624 may decrease a tension in the cables. For example, the actuator 624 may decrease a tension in one or both of the first through cable 642 or the second through cable 644 in order to decrease a magnitude of the angle of the attack. This may be desirable in order to decrease lift generated by the foil system 600. As such, rather than binary configurations, FIGS. 6A and 6B show two possible angles of attack along a spectrum of possibilities. The tension in the through cables is varied in order to modify the angle of attack to generate a target lift, and as such, the tension may be varied in any appropriate manner in order to achieve a desired positioning or other manipulation of marine array components using the lift generated by the foil system 600.

Figure 7:
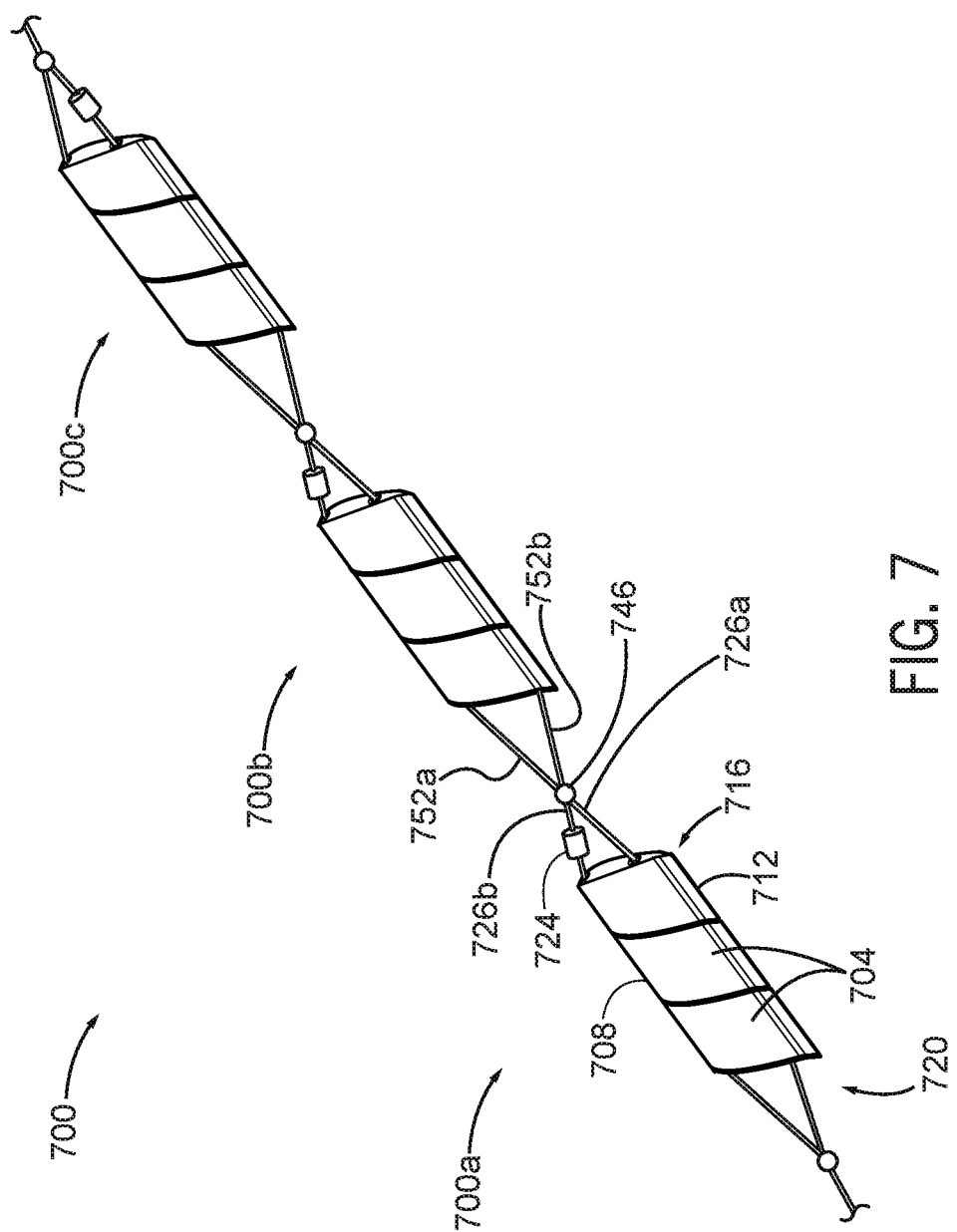
FIG. 7 depicts a modular foil system of the present disclosure.

The foil systems described herein may be used to define modules of a modular foil system, such as the modular foil system 700 described with respect to FIG. 7. For example, groups of foil sections may be "daisy-chained" or otherwise linked to one another in order to create a modular foil system. Each group of foil sections may be tunable in order to generate a particular lift that may be different than other groups of foil sections of the modular foil system. This construction may enhance the adaptability and precision of the system. For example, as described herein, each group of foil sections may be supported within the modular foil system by through cables and the tension may be distinctly controlled for each respective group of foil sections. In this manner, not only may each group of foil sections (module) have a distinct tension (and therefore distinct angle of attack), the through cables may be more responsive to actuators configured to adjust the tension, for at least because the tension is adjusted over a shorter, more isolated span of cable. The daisy-chaining or linking of the groups of foil sections may allow the modular foil system to generate lift over a larger span within the marine array, thereby enhancing the possibilities for array designs that implement foil systems over a large span.

To illustrate the foregoing, FIG. 7 depicts the modular foil system 700. The modular foil system 700 may include modules that are daisy-chained or linked to one another in order to form the modular foil system 700. In the example of FIG. 7, the modular foil system 700 includes a first module 700a, a second module 700b, and a third modular 700c; however in other embodiments, more or fewer modules may be used. Broadly each of the modules 700a, 700b, 700c may include a group of foil sections, such as any of the foil sections described herein, that cooperate to form a foil shape and generate lift. In this regard, each of the modules 700a, 700b, 700c may be configured to have an angle of attack with respect to a direction of flow. The angle of attack for each of the module 700a, 700b, 700c may be adjustable. This may allow each module 700a, 700b, 700c to have a distinct angle of attack, and subsequently generate a distinct lift. This may allow the modular foil system 700 to tune the lift generated along specific regions of the system, for example such as increasing the lift generated at a first or second end, without necessarily adjusting the lift in other or adjacent regions of the system. As such, the modular foil system 700 may more precisely control lift generation along its entire length or span, and also allow for differential lift generation, which may be appropriate, for example, where distinct components or assemblies of the marine array (having different lift or positioning requirements) are attached along different region of the system 700.

It will be appreciated that each of the modules 700a, 700b, 700c may include components substantially analogous to the component described herein with respect to various other foil systems, such as the foil system 500 and the foil system 600 of FIGS. 5 and 6, 6B, respectively. For purposes of illustration, the module 700a is shown as having foil sections 704, a leading edge 708, a trailing edge 712, a first pair of through cables 726a, 726b, an actuator 724, and a connection 746; redundant explanation of such components is omitted here for clarity. Accordingly, the modules 700b and 700c may also include such components, such as a second pair of through cables 752a, 752b, and associated functionality; however, this is not required.

The modules 700a, 700b, 700c may be daisy-chained or linked to one another, in part, due to the convergence of through cables (that support the groups of foil section) toward connection points. For example, a connection point (e.g., connection point 746) may be a ring, a knot, a pulley, or other point situated between adjacent groups of foil sections. The adjacent groups of foil sections may be connected to one another using the connection point.

In the example of FIG. 7, the modular foil system 700 includes the first pair of through cables 726a, 726b that supports the foil sections of the module 700a. The modular foil system 700 also includes the second pair of through cables 752a, 752b that supports the foil sections of the module 700b. The first pair of through cables 726a, 726b may converge toward the connection point 746. This may allow the module 700a to attach to a discrete assembly of the marine array at the connection point 726. For example, the discrete assembly may be the second module 700b, as shown in FIG. 7. As such, the second pair of through cables 752a, 752b may also converge toward the connection point 746. As described herein, because each of the first pair of through cables 726a, 726b and the second pair of through cables 752a, 752b converge toward the connection point 746, foils of the module 700a may articulate relative to foils of the module 700b.

Despite being connected to one another using the connection point 746, the first module 700a may move (or pivot) generally independent from the adjacent module 700b. Further, the connection point 746 may provide a demarcation between the first pair of through cables 726a, 726b and the second pair of through cables 752a, 752b, thereby allowing for each of the modules 700a, 700b to have distinct tensions. For example, an actuator associated with the first module 700a may be configured to alter a tension in one or both of the pair of through cables 726a, 726b, and an actuator associated with second module 700b may be configured to alter a tension in one or both of the second pair of through cables 752a, 752b generally independent of the actuator associated with the first module 700a. As described herein, the adjustment of tension in the through cables may influence an angle of attack of the foil sections, and hence the lift generated. Accordingly, because the tension in the first pair of through cables 726a, 726b may be adjusted independent of an adjustment in tension of the second pair of through cables 752a, 752b, an angle of attack (and generated lift) may also be different in each respective module of system 700.

It will be appreciated that the adjustable angle of attack of the modules 700a, 700b is shown and described for purposes of illustration. As shown in FIG. 7, the modular foil system 700 also includes the third module 700c, which may also have an adjustable angle of attack, for example, substantially analogous to that described with respect to the modules 700a, 700b. In yet other case, the modular foil system 700 may have a fourth, fifth, sixth, seventh, or any appropriate number of modules, each linked to one another. In such cases, some or all of the individual modules may also have an adjustable angle of attack.

Figure 8A:
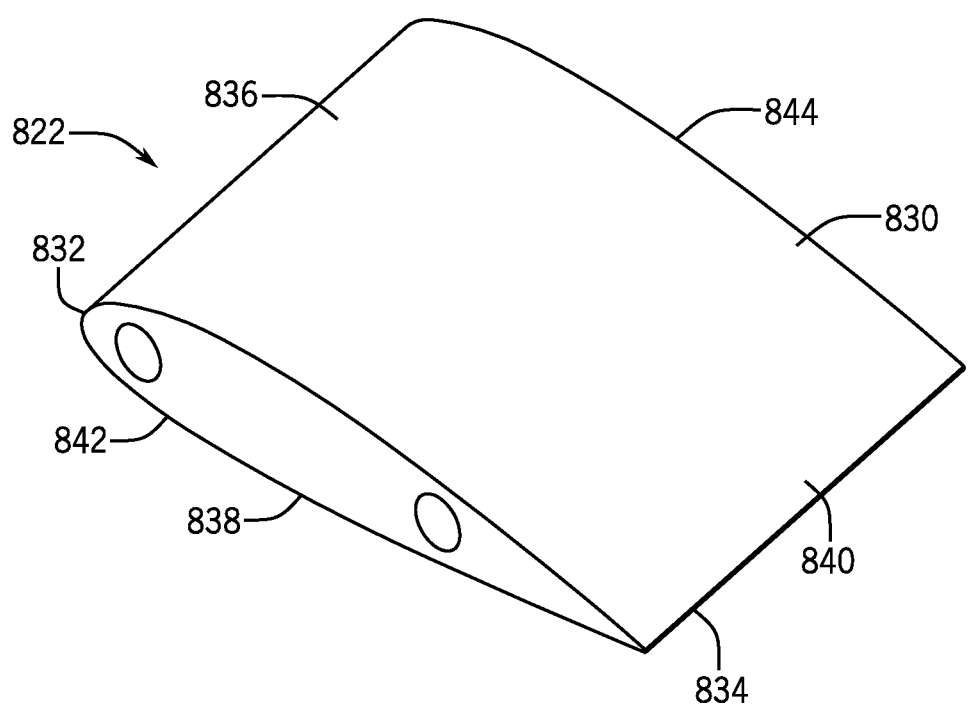
FIG. 8A depicts an isometric view of a single modular foil depressor section.
Figure 8B:
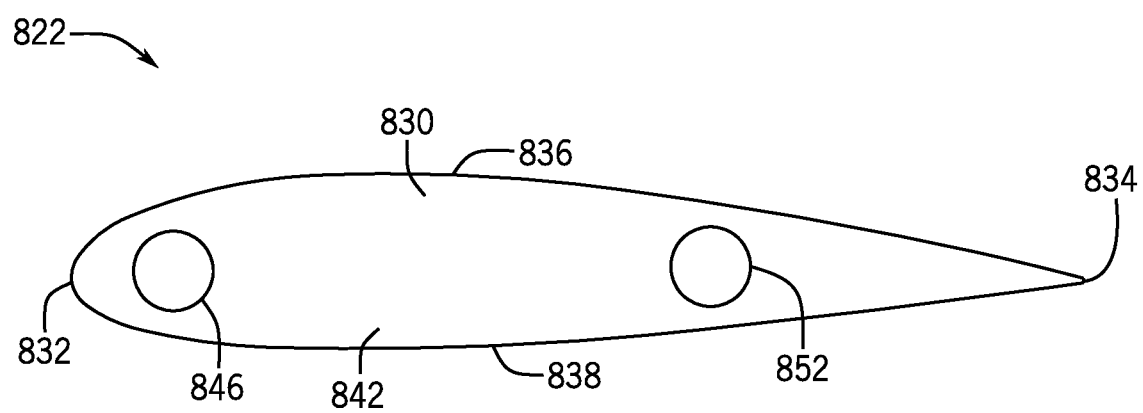
FIG. 8B depicts a cross-section view of the modular foil depressor section of FIG. 8A taken along line 8B-8B as indicated in FIG. 8A.

An exemplary form of a single foil section 822 of a modular wing foil system is depicted in FIGS. 8A and 8B. The foil section 822 is scalable to suit a wide range of lift requirements, while also offering very high aspect ratios. The foil section 822 has a body 830 with a foil shape having a leading edge 832 and a trailing edge 834. The line connecting the leading edge 832 and the trailing edge 834 passing through the mid-thickness of the body 830 is referred to as the "chord line" of the foil shape. When viewed from a top plan perspective, the foil section 822 may appear rectangular in shape. A first surface 836 extends between the leading edge 832 and the trailing edge 834 and may be cambered. A second surface 838 of the body 830 extends between the leading edge 832 and the trailing edge 834 and may be relatively flat with respect to the first surface 836.

The body 830 has two lateral sides 842, 844 that extend between the lateral edges of the first surface 836 the second surface 838 and between the leading edge 832 and the trailing edge 834. The body 830 may be made from solid cast polyurethane for near-neutral buoyancy and high abrasion resistance and durability. However, the body 830 may still be slightly negatively buoyant, such that the body 830 will influence the equilibrium angle of attack, especially at low tow speeds. Thus, the downforce achieved by the foil section 822 may be influenced by selecting the composition of the body 830.

A first tubular conduit 846 may be defined within the body 830 and extend laterally through the body 830 adjacent to the leading edge 832 and open to each of the first and second lateral sides 842, 844. The first tubular conduit 846 is sized to receive ropes or cables (such as separation ropes and/or spur lines) of a seismic array therethrough.

A second tubular conduit 852 may be defined within the body 830 forward of the trailing edge 834 and extend laterally therein parallel to the first tubular conduit 846 and open to each of the first and second lateral sides 842, 844. The first tubular conduit 846 may be positioned within the aft 50 percent of the of the cord length of the foil section 822. The second tubular conduit 852 may be similarly sized to receive a rope or cable therethrough.

The number of foil sections 822 in a modular foil depressor 120 or a wing foil system 420 is scalable to suit a wide range of lift requirements, while also offering very high aspect ratios. In some cases, this can avoid the need for a supplementary ballast. In other cases, supplementary ballast can be desirable, and integrated with one or more foil sections of the present disclosure, such as those shown below with reference to FIGS. 9-11. The foil sections 822 may rotate in a flow field. The angle of attack at which the modular foil depressor 120 or wing foil system 420 can achieve equilibrium will be a function of the moment coefficient of the particular cross-section of the foil 822 being used, and the comparative tensions established in the forward through cable 642 versus the aft through cable 644. When the aft through cable is completely slack, the center of rotation for the foil section 822 will be the forward through hole 846. As the tension balance changes between the forward through cable 642 and the aft through cable 644, the center of rotation is transferred to the aft through hole 852, at which point the forward through cable 642 acts to prevent further rotation of the foil 822 about its center of rotation, thereby setting the new equilibrium angle of attack.

Consequently, the magnitude of downforce generated by a modular foil depressor 120 or outward force generated by a wing foil system 420 formed by foil sections 822 can be controlled by various factors including the following:

Adjusting the overall span of the modular foil depressor 120 or wing foil system 420 (i.e. the number of depressor sections 822 threaded onto the rope or rod);

Varying the length of the chord of the foil sections 822 (i.e. customize the size of the foil sections 822 at time of manufacture to suit the required end application); and Choice of camber for the foil profile of the foil sections 822 (lesser or greater cambered foil depressor sections 822 generate lower or higher lift coefficients).

The second rope or cable threaded through the second tubular conduit 852 in the foil sections 822 of the modular foil depressor 120 or wing foil system 420 allows for adjustment of the lift by controlling the catenary (billow) of the modular foil depressor 120 wing foil system 420. The pair of ropes may be adjusted in length to effect controllable adjustments in lift. The equilibrium angle of attack achieved is a function of the relative lengths of the dual ropes. For example, if the aft rope passing through the second tubular conduit 852 in the aft half of the foil sections 822 is shortened with respect to the rope passing through the first tubular conduit 846, the trailing edges 834 of the depressor sections 822 will be pushed closer together laterally as compared to spacing between the foil sections 822 at the leading edges 832. This causes the modular foil depressor 120 or wing foil system 420 to billow and change the angle of attack along the length of the modular foil depressor 120 or wing foil system 420.

The modular foil depressor offers high aspect ratios and high lift-to-drag efficiency. The modular foil depressor offers a high degree of flexibility in terms of the number of choices available, including pivot location, camber, chord length, and tail fin size and angle, to selectively adjust the downforce to suit operational requirements and specifications. Lift is also adjustable by adjusting the tension in the cables running through the foils.

The modular foils of the present disclosure can also be adapted to receive a ballast material and/or to add buoyance to the foil. For example, in particular applications, it can be desirable to selectively increase a weight in the foil section. This can enhance the stability of the foil and/or facilitate orientating the foil in a particular configuration. Additionally or alternatively, it can be desirable to add pockets to the foil section that operate to enhance the buoyance of the foil section. In some cases, the same structure of the foil section can be used to facilitate buoyancy enhancement and ballast adding. For example, a pocket, tube, channel, or the like can be formed in the foil section. This pocket or other like structure can define an enhanced buoyance portion of the foil section. The pocket can also be adapted to receive a ballast material, based on the desired application.

Figure 9:
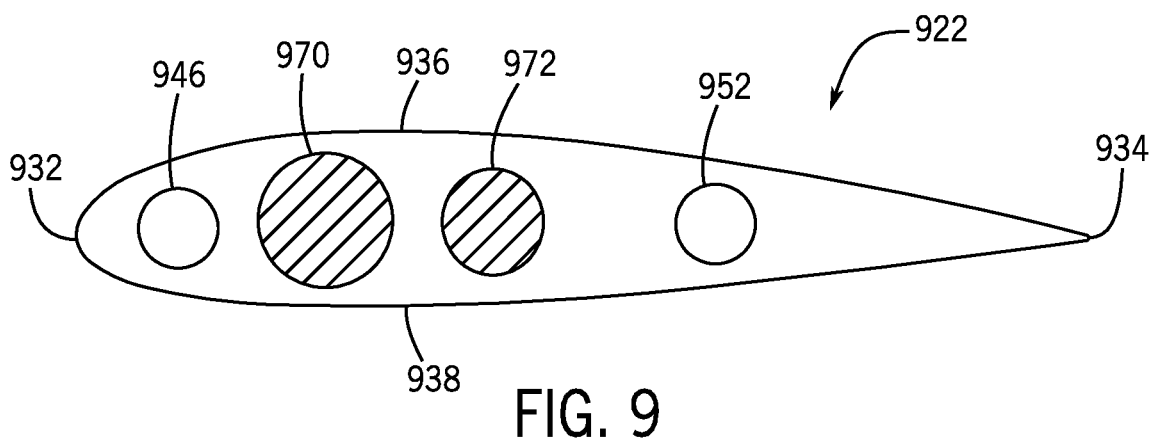
FIG. 9 depicts a cross-section view of another embodiment of a foil section.
Figure 10:
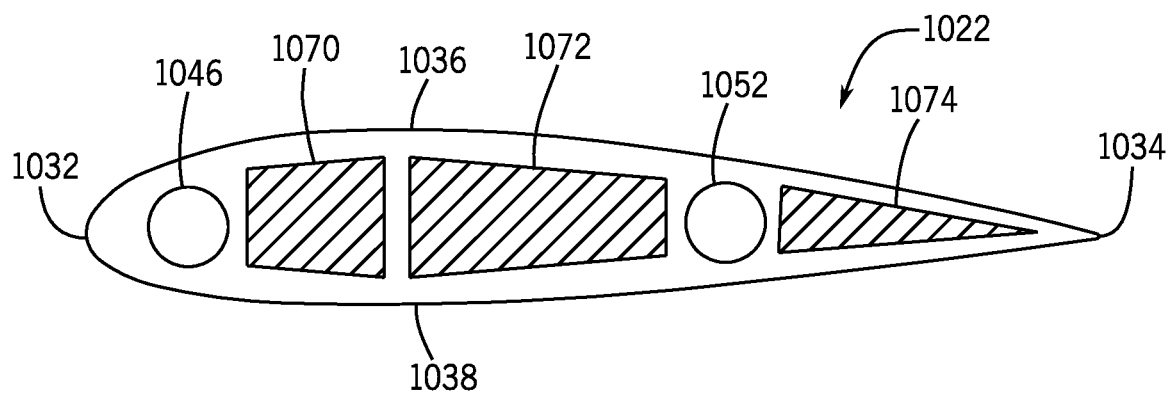
FIG. 10 depicts a cross-section view of another embodiment of a foil section.
Figure 11:
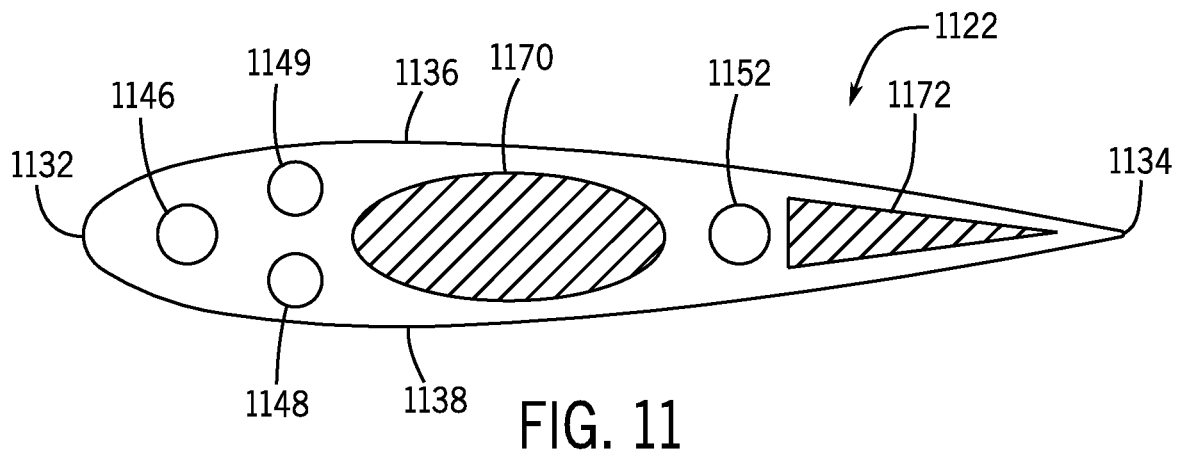
FIG. 11 depicts a cross-section view of another embodiment of a foil section.

FIGS. 9-11 show example cross-sections of a foil section that can include a buoyancy pocket and/or be adapted to receive ballast material. It will be appreciated that the foil sections show in FIGS. 9-11 can be used with any of modular foil system described herein. For example, the modular foil systems of the present disclosure can include a plurality of foil sections, and some or all of the plurality of foil sections can include a foil section adapted to include a buoyance pocket and/or to receive a ballast material. In some cases, this can include a combination of foil sections, some of which have a buoyance pocket and/or ballast materials, along with other foil sections that do not necessarily include such features. The example geometries of foil sections of FIGS. 9-11 are therefore presented for purposes of illustration; in other embodiments, other geometries are contemplated herein.

With reference to FIG. 9, a foil section 922 is shown. The foil section 922 can be substantially analogous to the foil section 822 described above, and as such include similar components and/or perform similar functions. In this regard, the foil section 922 includes a leading edge 932, a trailing edge 934, a first surface 936, a second surface 938, a first tubular conduit 946, and a second tubular conduit 952. FIG. 9 also shows the foil section including a first pocket 970 and a second pocket 972. The first and second pockets 970, 972 can be features formed into a body of the foil section 922. For example, the first and second pockets 970, 972 can be channels, bores, through-portions, or other like features that extend through some or all of a cross-dimension of the foil section 922. The first and second pockets 970, 972 can be adapted to define a buoyancy-enhanced portion of the foil section 922, such as may be the case where the pockets 970, 972 are filled with a material having a less density of the fluid within which the foil section 922 is immersed or partially immersed. In other cases, the first and second pockets 970, 972 can be adapted to receive a ballast material. The ballast material can generally have a density that is similar to or greater than a density of the fluid within which the foil section is immersed or partially immersed.

With reference to FIG. 10, a foil section 1022 is shown. The foil section 1022 can be substantially analogous to the foil section 1022 described above, and as such include similar components and/or perform similar functions. In this regard, the foil section 1022 includes a leading edge 1032, a trailing edge 1034, a first surface 1036, a second surface 1038, a first tubular conduit 1046, and a second tubular conduit 1052. FIG. 10 also shows the foil section 1022 as including a first pocket 1070, a second pocket 1072, and a third pocket 1074. The pockets 1070, 1072, 1074 can be substantially analogous to the pockets 970, 972 described above in relation to FIG. 9. Notwithstanding, the pockets 1070, 1072, 1074 can have a different geometry and arrangement on the foil section 1022. For example, as shown in FIG. 10, the first and second pockets 1070, 1072 are arranged generally between the first and second tubular conduits 1046, 1052, and the third pocket 1074 is arranged generally between the second tubular conduit 1052 and the trailing edge 1034. The pockets 1070, 1072, 1074 can generally assume a larger cross-sectional area of the foil section than that of the pockets of FIG. 9, and thus can be adapted to provide enhanced buoyance or ballast as may be appropriate for a given application.

With reference to FIG. 11, a foil section 1122 is shown. The foil section 1122 can be substantially analogous to the foil section 1122 described above, and as such include similar components and/or perform similar functions. In this regard, the foil section 1122 includes a leading edge 1132, a trailing edge 1134, a first surface 1136, a second surface 1138, a first tubular conduit 1146, and a second tubular conduit 1152. A third tubular conduit 1148 and a fourth tubular conduit 1149 are also shown, which may be adapted to receive one or ropes or cables, as described herein in relation to other forward-most conduits of the foil sections described herein. FIG. 11 also shows the foil section 1122 as including a first pocket 1170 and a second pocket 1172. The pockets 1170, 1172 can be substantially analogous to the pockets 970, 972 described above in relation to FIG. 9. Notwithstanding, the pockets 1170, 1172 can have a different geometry and arrangement on the foil section 1122. For example, as shown in FIG. 11, the first pocket 1170 can have a first shape and be arranged generally between the collection of the tubular conduits 1146, 1148, 1149 and the tubular conduit 1152. The second pocket 1172 can have a second shape and be arranged generally between the fourth tubular conduit 1152 and the trailing edge 1134. With the differing shape of the first and second pockets 1170, 1172 the foil section 1122 can be adapted to exhibit buoyance and ballast properties that can be different from those exhibited, for example, by the foil section 922. In other cases, other geometries are possible and contemplated herein.

Modular foil depressors applied to umbilicals or other similar type cables can also be scaled by how many are deployed, for example, by daisy-chaining depressor sections at intervals along the cable. As described herein, modular foil depressors, including various combination of foil sections, shapes, systems, and so forth may be used to generate a negative lift (e.g., along a perpendicular direction) that depresses or maintains components of a marine array at a submerged depth.

Figure 12:
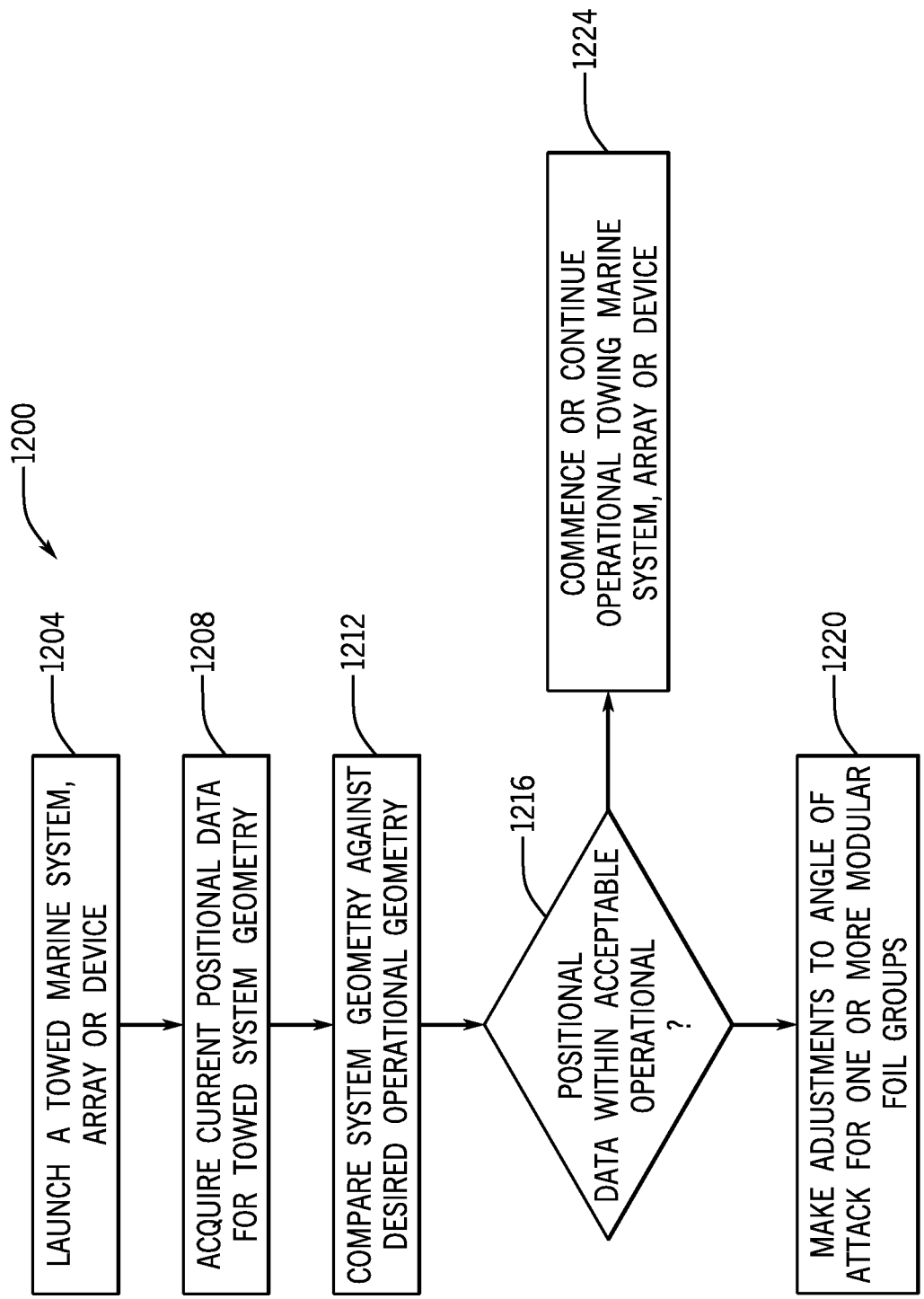
FIG. 12 depicts a flow diagram for a method of steering a foil system of a marine array.

To facilitate the reader's understanding of the various functionalities of the embodiments discussed herein, reference is now made to the flow diagram in FIG. 12, which illustrates process 1200. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 12, process 1200 relates generally to positioning a modular foil system in a marine array. The process 1200 may be used with any of the foil systems, modular foil systems, and so forth, described herein, such as the foil systems 500, 600 and modular foil system 700, and variations and embodiments thereof.

At operation 1204, a towed marine, system, array or device is launched. In some cases, the array may include a cable configured to carry a payload and a modular foil system coupled to the cable.

As one example and with reference to FIG. 2 the seismic array 200 may be launched into a marine environment. The seismic array 200 may include various cables, such as the cross cable 208. The seismic array 200 may also include a modular foil system coupled to the cable, such as the modular foil depressor 220.

At operation 1208, positional data is acquired for the towed cable, payload, or other towed device. For example and with reference to FIG. 1, one or more sensors of the seismic array 100 may determine or detect a position of an instrument payload towed by a vessel.

At operation 1212, the acquired positional data is compared with an operational target, such as a target position, for the towed cable, payload, or other towed device. For example and with reference to FIG. 1, the seismic array may include one or more processing units, including computer executable instructions, that operate to compare the acquired positional data with a target position. In turn, at operation 1216, the processing unit or other associated equipment, may determine the positional data is within operational tolerances. For example, the processing unit and/or other associated component may determine an adjustment parameter for the modular foil system based on the comparing of the acquired positional data and the target position. This adjustment parameter may in turn be used to adjust an angle of attack and control lift of the modular foil system.

For example, at operation 1220, an angle of attack may be adjusted for one or more modular foil systems of the array. This may involve adjusting an angle of attack of a foil section relative to other components of the array. For example and with reference to FIG. 7, a group of foil sections of a first module 700a may be adjusted relative to an angle of attack of a second group of foil sections 700b. To facilitate the foregoing, a tension in through cables supporting the first group of foil sections may be adjusted independent of a tension in a second pair of through cables that supports the second group of foil sections. Accordingly, the first group of foil sections may generate a lift that is distinct from a lift generated by the second group of foil sections. This may be facilitated by an actuator, such as a dynamic actuator, that uses the adjustment parameter to control the tension and adjust the angle of attack.

The method of FIG. 12 may, subsequent to the operation 1220, return to the operation 1208. At the second iteration of the operation 1208, the method 1200 may proceed by acquiring positional data for the towed payload subsequent to the adjustments to the angle of attack of the operation 1220. In this regard, the method 1200 may continue and determine whether the adjustments to the angle of attack achieved the appropriate or desired position of the towed payload. For example, at the second iteration of the operation 1212 the acquired positional data (for the payload influenced by the adjusted angle of attack of operation 1220) is compared with a target position for the towed cable, payload, or other towed device. In turn, at the second iteration of the operation 1216, the subsequently acquired positional data is determined to be within operation tolerance.

In this regard, upon a determination at the operation 1216 that the acquired positional data is within operation tolerance, the method 1200 may proceed to operation 1224. At the operation 1224, towing may be continued (or commenced) for the marine system, array, or device.

Figure 13:
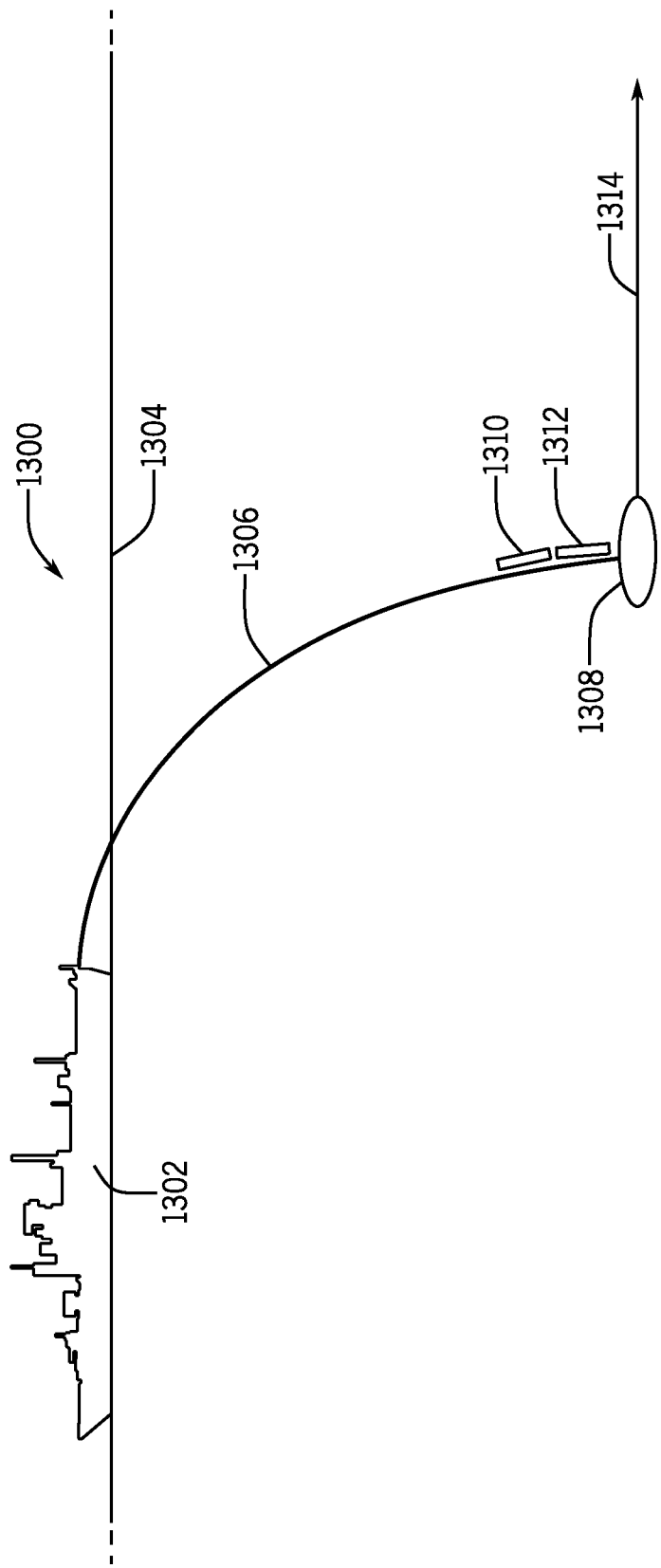
FIG. 13 depicts another embodiment of a marine array.

FIG. 13 depicts another embodiment of a marine array. In particular, FIG. 13 shows a marine array 1300. The marine array 1300, as within any of the marine arrays described herein, may be, or be associated with, a seismic array, a fishing trawl, a military application, an oceanographic study, and/or substantially any other maritime application. The embodiment of FIG. 13 shows the marine array having towed cable and payload that is steered or positioned within a marine environment by a starboard and a port biased foil system.

To facilitate the foregoing, the marine array includes a vessel 1302. The vessel 1302 is shown positioned along a surface of an marine environment 1304. Attached to the vessel 1302 is a tow cable 1306. The tow cable 1306 may be towed through the marine environment 1304 by the vessel 1302. The tow cable 1306 may carry or pull a towed body or other payload 1308 through the marine environment 1304. In some cases, a streamer cable 1314 may be pulled by the towed body 1308 through the marine environment 1304.

It may be desirable to steer, position, stabilize, and so on the towed body 1308 and associated components within the marine environment 1304. In this regard, FIG. 13 shows the marine array 1300 including a first foil system 1310 and a second foil system 1312 coupled with the towed cable 1306. The first foil system 1310 and the second foil system 1312 may be substantially analogous to any of the foil systems described herein. As such, the first foil system 1310 and the second foil system 1312 may each include a group of foil sections collectively defining an angle of attack and thus be configured to generate lift.

In one embodiment, the first foil system 1310 may have an angle of attack that causes the first foil system 1310 to generate lift that biases the towed cable 1306 toward a starboard direction. Further, the second foil system 1312 may have an angle of attack that causes the second foil system 1321 to generate lift that biases the towed cable 1306 toward a port direction. In this regard, the first foil system 1310 and the second foil system 1312 may counteract one another and thus help stabilize or otherwise control a position of the towed body 1308 in the marine environment 1304. In some cases, the angle of attack of one or both of the first foil system 1310 or the second foil system 1312 may have an adjustable angle attack, which may be manipulated to help steer the towed body 1308, as may be appropriate for a given application.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A marine array, comprising:
a first cable configured to be towed by a vessel and carry a submerged payload through a marine environment; and
a modular foil system coupled with the first cable and configured to bias the submerged payload toward a target position, the modular foil system including:
a group of foil sections collectively defining an angle of attack;
a pair of through cables supporting the group of foil sections within the modular foil system and converging toward a first connection point at a first end of the group of foil sections and a second connection point at a second end of the group of foil sections, the first end opposite the second end; and
a second cable coupled to the first connection point and extending away from the group of foil sections.

2. The marine array of claim 1, further comprising an actuator configured to alter a tension in one or both of the pair of through cables, thereby altering the angle of attack.

3. The marine array of claim 1, wherein:
the group of foil sections is a first group of foil sections defining a first angle of attack;
the pair of through cables is a first pair of through cables; and
the modular foil system further comprises:
a second group of foil sections collectively defining a second angle of attack; and
a second pair of through cables supporting the second group of foil sections within the modular foil system and converging toward the first connection point.

4. The marine array of claim 3 further comprising an actuator configured to alter a tension in one or both of the first pair of through cables, thereby altering the first angle of attack relative to the second angle of attack, the second angle of attack being distinct from the first angle of attack.

5. The marine array of claim 1, wherein the submerged payload is an instrument configured to at least one of collect data or transmit data.

6. The marine array of claim 1, wherein the target position includes at least one of a lateral position or a depth position.

7. The marine array of claim 1, wherein:
the first cable is towed by the vessel;
the marine array further comprises a third cable towed by the vessel; and
the modular foil system is arranged substantially between submerged portions of the first cable and the third cable.

8. The marine array of claim 1, wherein:
the first cable is a cross-cable;
the marine array further comprises streamer cables configured to be towed behind the cross-cable;
the submerged payload includes seismic receivers carried by the streamer cables; and
the angle of attack is configured to maintain the seismic receivers at a desired depth.

9. The marine array of claim 1, wherein:
the first cable is a lateral cable of the marine array under tension;
the lateral cable includes an end portion positioned along an edge of the marine array; and
the modular foil system is coupled with the lateral cable adjacent the end portion.

10. The marine array of claim 9, wherein:
the marine array further comprises a spur line connected to the end portion of the lateral cable; and
the modular foil system is connected to the spur line opposite the lateral cable.

11. The marine array of claim 1, wherein:
the first cable is an upper cable;
the modular foil system is a first modular foil system; and
the marine array further comprises
a lower cable; and
a second modular foil system, according to the modular foil system described in claim 1, attached to the lower cable; and
the upper cable and the lower cable cooperate to form a mouth of a fishing trawl.

12. A marine array comprising:
a first cable configured to be towed by a vessel and carry a submerged payload through a marine environment; and
a modular foil system coupled with the first cable and configured to bias the submerged payload toward a target position, the modular foil system comprising:
a first group of foil sections having a first angle of attack;
a first pair of through cables supporting the first group of foil sections and converging toward a first connection point at a first end of the first group of foil sections and a second connection point at a second end of the first group of foil sections, the first end opposite the second end;

a second cable coupled to the first connection point and extending away from the group of foil sections; and a second group of foil sections having a second angle of attack, wherein the first angle of attack is adjustable relative to the second angle of attack.

13. The marine array of claim 12, wherein the connection point couples the first group of foil sections to a discrete assembly of the marine array.

14. The marine array of claim 13 further comprising an actuator configured to alter a tension in one or both of the first pair of through cables, thereby altering the first angle of attack.

15. The marine array of claim 14, wherein the actuator is a dynamic actuator configured to alter the tension in one or both of the first pair of through cables while submerged in the marine environment.

16. The marine array of claim 14, wherein the actuator is a turnbuckle coupled to one of the first pair of through cables.

17. The marine array of claim 13, wherein:
the modular foil system further comprises a second pair of through cables;
the second group of foil sections is supported in the modular foil system by the second pair of through cables;
the second pair of through cables converge toward the first connection point; and
the second group of foil sections is the discrete assembly coupled to the first group of foil sections at the first connection point.

18. The marine array of claim 12, wherein:
the first cable is a cross-cable;
the marine array further comprises streamer cables configured to be towed behind the cross-cable;
the payload includes seismic instruments carried by the streamer cables; and
both of the first angle of attack and the second angle of attack are configured to maintain seismic receivers at a desired depth.

19. The marine array of claim 18 further comprising a pair of paravanes positioned at opposing ends of the cross-cable and configured to laterally spread the cross-cable when towed in the marine environment.

20. The marine array of claim 19, wherein:
the pair of paravanes are configured to provide a positive lift to the cross-cable along a substantially vertical direction; and
the modular foil system is configured to provide a negative lift to the cross-cable along the substantially vertical direction, the negative lift operating to counteract the positive lift provided by the pair of paravanes.

\* \* \* \* \*